US006816081B1

(12) United States Patent
Okada et al.

(10) Patent No.: US 6,816,081 B1
(45) Date of Patent: Nov. 9, 2004

(54) APPARATUS FOR REMOTELY CONTROLLING DEVICE FOR MOBILE BODY

(75) Inventors: Hiroki Okada, Toyota (JP); Misako Sugiura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/230,028

(22) PCT Filed: May 11, 1998

(86) PCT No.: PCT/JP98/02058

§ 371 (c)(1), (2), (4) Date: Oct. 21, 1999

(87) PCT Pub. No.: WO98/51892

PCT Pub. Date: Nov. 19, 1998

(30) Foreign Application Priority Data

| | | |
|---|---|---|
| May 16, 1997 | (JP) | 9/127526 |
| Sep. 2, 1997 | (JP) | 9/237351 |
| Jan. 14, 1998 | (JP) | 10/6070 |

(51) Int. Cl.[7] .................. H04Q 1/00

(52) U.S. Cl. .................. 340/825.5; 340/5.6; 340/5.61; 340/5.63; 340/5.72; 340/5.21; 340/825.69; 340/5.64

(58) Field of Search .................. 340/5.6, 5.61, 340/5.72, 5.63, 5.21, 5.27, 5.51, 5.62, 825, 825.72, 825.69, 5.64

(56) References Cited

U.S. PATENT DOCUMENTS

| | | | | | |
|---|---|---|---|---|---|
| 4,897,644 | A | | 1/1990 | Hirano | 340/825.31 |
| 4,942,393 | A | * | 7/1990 | Waraksa et al. | 340/825 |
| 5,134,392 | A | * | 7/1992 | Takeuchi et al. | 340/825.69 |
| 5,552,641 | A | | 9/1996 | Fischer et al. | 307/10.5 |
| 5,742,237 | A | * | 4/1998 | Bledsoe | 340/825.49 |
| 5,838,257 | A | * | 11/1998 | Lambropoulos | 340/825.54 |
| 6,128,489 | A | * | 10/2000 | Seazholtz et al. | 455/432 |

FOREIGN PATENT DOCUMENTS

| | | |
|---|---|---|
| EP | 0 570 761 A1 | 11/1993 |
| GB | 2 306 573 A | 5/1997 |
| JP | 60-159265 | 8/1985 |
| JP | 4-110874 | 9/1992 |
| JP | 5-156851 | 6/1993 |
| WO | WO 92/18732 | 10/1992 |

* cited by examiner

*Primary Examiner*—Michael Horabik
*Assistant Examiner*—Vernal Brown
(74) *Attorney, Agent, or Firm*—Pillsbury Winthrop LLP

(57) ABSTRACT

A transmitter 16, receiver 20 and control circuit 10are provided on a mobile unit, and a response circuit 26, 28, 30 and a control circuit 32, 34, 30 are provided on a portable unit. Priorities are assigned to the transmission of a recognition signal by the response circuit and the transmission of a recognition signal by the operation circuit, and by so doing the transmission from the operation circuit is given priority and performed first if both transmissions are requested simultaneously.

8 Claims, 19 Drawing Sheets

APPARATUS FOR REMOTELY CONTROLLING DEVICE FOR MOBILE BODY

This application is the national phase of international application PCT/JP02058 filed May 11, 1998 which designated the U.S.

FIELD OF THE INVENTION

The present invention relates to a mobile unit remote control apparatus, in particular a mobile unit remote control apparatus for remotely controlling the instruments of an automobile or other mobile unit.

BACKGROUND OF THE INVENTION

Conventionally, there is a so-called smart entry system, in which the doors of a vehicle are locked and unlocked, as the case may be, simply by bringing a portable, compact, wireless device into proximity with the vehicle and removing the device from the vicinity of the vehicle, respectively. Japanese Laid-Open Patent Application No. 5-156851, for example, discloses a vehicle wireless door lock control apparatus comprising a transmitter-receiver unit installed on the vehicle that intermittently emits a radio frequency for the portable unit search and a portable unit that transmits return transmission electromagnetic waves having a predetermined code once it receives this search wave, unlocking the doors when the transmitter-receiver unit determines that the transmission wave code matches a specified code.

The conventional smart entry system also carries a wireless system for locking and unlocking the vehicle doors by operating-existing buttons, in preparation for those times in which the,predetermined code of the transmission wave transmitted from the portable unit cannot be matched with the specified code at the transmitter-receiver unit. For this reason the portable unit can be made to carry a wireless system switch. In this case, however, there is a possibility that the smart entry system and wireless entry system may compete with each other, and it was not made clear which of the two systems—the smart entry system or the wireless system—was given priority over the other.

Usually, the portable unit of a smart entry system receives a transmission request signal and proceeds to detect the vehicle, so in terms of battery capacity it consumed a not inconsiderable amount of power. When both systems were operated using a single power source the power consumption of the portable unit not only drained the battery to the point where not only the smart entry system no longer functioned but also the wireless system did not function, either.

Moreover, in order to decrease power consumption the portable unit receiver had to be made simple, which sometimes meant that in strong electrical fields or other areas subject to interference the portable unit mistook this electromagnetic activity for search waves and continued to erroneously transmit return waves. Areas subject to interference include the strong electrical fields near high-voltage power transmission lines and microwave emission sources such as microwave ovens and certain medical equipment. These erroneous transmissions further increased the speed with which the battery was drained of power by the portable unit.

In response to this problem systems have been created that differentiate the frequency band of the search wave from that of the return wave transmitted from the portable unit so as to provide a transmitter-receiver unit with a high degree of frequency selectivity in contrast to the low degree of frequency selectivity of the portable unit, such that when the portable unit comes within a predetermined distance from the vehicle the portable unit transmits an answering signal in response to a questioning signal from the transmitter-receiver unit to release the door lock. However, in areas subject to interference, once the portable unit comes within a predetermined distance from the transmitter-receiver unit an answering signal is transmitted from the portable unit even if no questioning signal has been transmitted from the transmitter-receiver unit, with the danger that the vehicle door will be unlocked against the volition of the user.

DISCLOSURE OF THE INVENTION

It is a general object of the present invention to provide a mobile unit remote control apparatus that prevents competition between the smart entry system and the wireless system by assigning priority to one or the other system.

It is another object of the present invention to provide a mobile unit remote control apparatus that can minimize unnecessary power consumption by the portable unit by halting the transmission of an answering signal after a predetermined period of time when continuously receiving a transmission request signal or a signal similar thereto.

It is another object of the present invention to provide a mobile unit remote control apparatus that can operate a wireless system even if the smart entry system no longer functions due to drainage of battery power, by assigning priority to one or the other of either a smart entry system power supply or a wireless system power supply.

In order to achieve the objects described above, one aspect of the present invention provides a mobile unit remote control apparatus comprising:

- a transmitter for transmitting transmission request signals mounted on the mobile unit;
- a receiver mounted on the mobile unit for receiving recognition signals transmitted from a portable unit;
- an instrument control circuit mounted on the mobile unit for controlling instruments installed on the mobile unit in response to a recognition signal received by the receiver;
- a response circuit mounted on the portable unit for transmitting a recognition signal in response to a transmission request signal transmitted from the transmitter unit; and
- an operation circuit mounted on the portable unit for transmitting a recognition signal in response to an operation input from an external source, unrelated to the transmission request, characterized in that priority rankings are assigned to the transmission of the recognition signal by the response circuit and the transmission of the recognition signal by the operation circuit.

By assigning priority rankings to the transmission of the recognition signal by the returning means and the transmission of the recognition signal by the user operating means in this manner, competition between the smart entry system and the wireless system can be prevented.

In the invention described above, the transmission of the recognition signal by the operation circuit may be given a higher priority than the transmission of the recognition signal by the response circuit. By doing so, the wireless system is given priority over the smart entry system and control reflecting the volition of the user can be carried out.

Also, operation of the receiver installed on the mobile unit may be commenced before operation of a transmitter. By doing so, the transmission of the recognition signal by the operating means is given priority and wireless system control can be given priority over smart entry system control.

A separate aspect of the present invention provides a mobile unit remote control apparatus comprising:

- a transmitter for transmitting transmission request signals mounted on the mobile unit;
- a receiver mounted on the mobile unit for receiving recognition signal transmitted from the portable unit;
- an instrument control circuit mounted on the mobile unit for controlling instruments installed on the mobile unit in response to a recognition signal received by the receiver; and
- a response circuit mounted on the portable unit for transmitting a recognition signal in response to a transmission request signal transmitted from the transmitter unit,
- characterized in that a halting means is provided on the portable unit for halting the transmission of a recognition signal after a predetermined period of time based on a trigger signal indicating that the transmission request signal has been received when such trigger signal is continuously generated.

According to the invention described above, unnecessary power consumption due to erroneous transmission of a recognition signal when the portable unit has erroneously detected a transmission request signal can be kept to a predetermined period of time, thus minimizing portable unit power consumption.

Another aspect of the present invention provides a mobile unit remote control apparatus comprising:

- a transmitter for transmitting transmission request signals mounted on the mobile unit;
- a receiver mounted on the mobile unit for receiving recognition signals transmitted from the portable unit;
- an instrument control circuit mounted on the mobile unit for controlling instruments installed on the mobile unit in response to a recognition signal received by the receiver;
- a response circuit mounted on the portable unit for transmitting a recognition signal in response to a transmission request signal transmitted from the transmitter unit; and
- an operation circuit mounted on the portable unit for transmitting a recognition signal in response to an operation input from an external source, unrelated to the transmission request,
- characterized in that the mobile unit remote control apparatus has a first power supply for supplying power to the response circuit and a second power supply for supplying power to the operation circuit, said second power supply being independent of the first power supply.

According to the invention described above, the wireless system can still be operated off the second power supply even if the smart entry system no longer operates because the first power supply has been exhausted. That is, the response circuit of the portable unit is constantly monitoring for receipt of the transmission request signal, which monitoring consumes a comparatively large amount of electrical power; by providing a separate first power supply for supplying power to the response circuit and second power supply for supplying power to the operation circuit, the operation circuit can be operated off the second power supply even if the first power supply is exhausted.

In addition, according to a separate aspect of the present invention, the mobile unit remote control apparatus may be provided with a common power supply for supplying power to the response circuit and the operation circuit, and a power supply interrupting means for interrupting the supply of power to the response circuit.

By doing so, the supply of power to the returning means can be halted when the smart entry system is not being used, thereby minimizing drainage of the common power supply and making it possible to continue to use the wireless system. Moreover, wireless system control can be assigned priority over smart entry system control. The power supply interrupting means may comprise a switch provided between the common power supply and the response circuit.

In addition, the power supply interrupting means may comprise a breaker circuit that interrupts the supply of power to said response circuit when the current capacity of the common power supply falls short of a predetermined value. By doing so, when the current capacity of the common power supply is below a predetermined value the supply of power to the returning means can be interrupted. Therefore operation of the smart entry system can be halted when the common power supply drains and the current capacity decreases, making it possible to minimize further drainage of the common power supply.

In addition, the power supply interrupting means may comprise a breaker circuit that interrupts the supply of power to the response circuit when the recognition signal from the portable unit is not transmitted for a predetermined period of time. By doing so, when the recognition signal from the portable unit is not transmitted after exceeding a predetermined period of time the unit perceives this as an indication that the user is not in the vicinity of the mobile unit, interrupts the supply of power to the returning means and halts operation of the smart entry system, thereby making it possible to minimize drainage of the power supply.

In addition, the instrument control means of the mobile unit remote control apparatus of the present invention may also be used to control the door locks of the mobile unit. By doing so, the doors of the mobile unit can be locked and unlocked.

Other objects, features and advantages of the present invention will become more apparent from the following detailed description when read in conjunction with the accompanying drawings.

BEST MODE FOR ACHIEVING THE INVENTION

Figure 1:
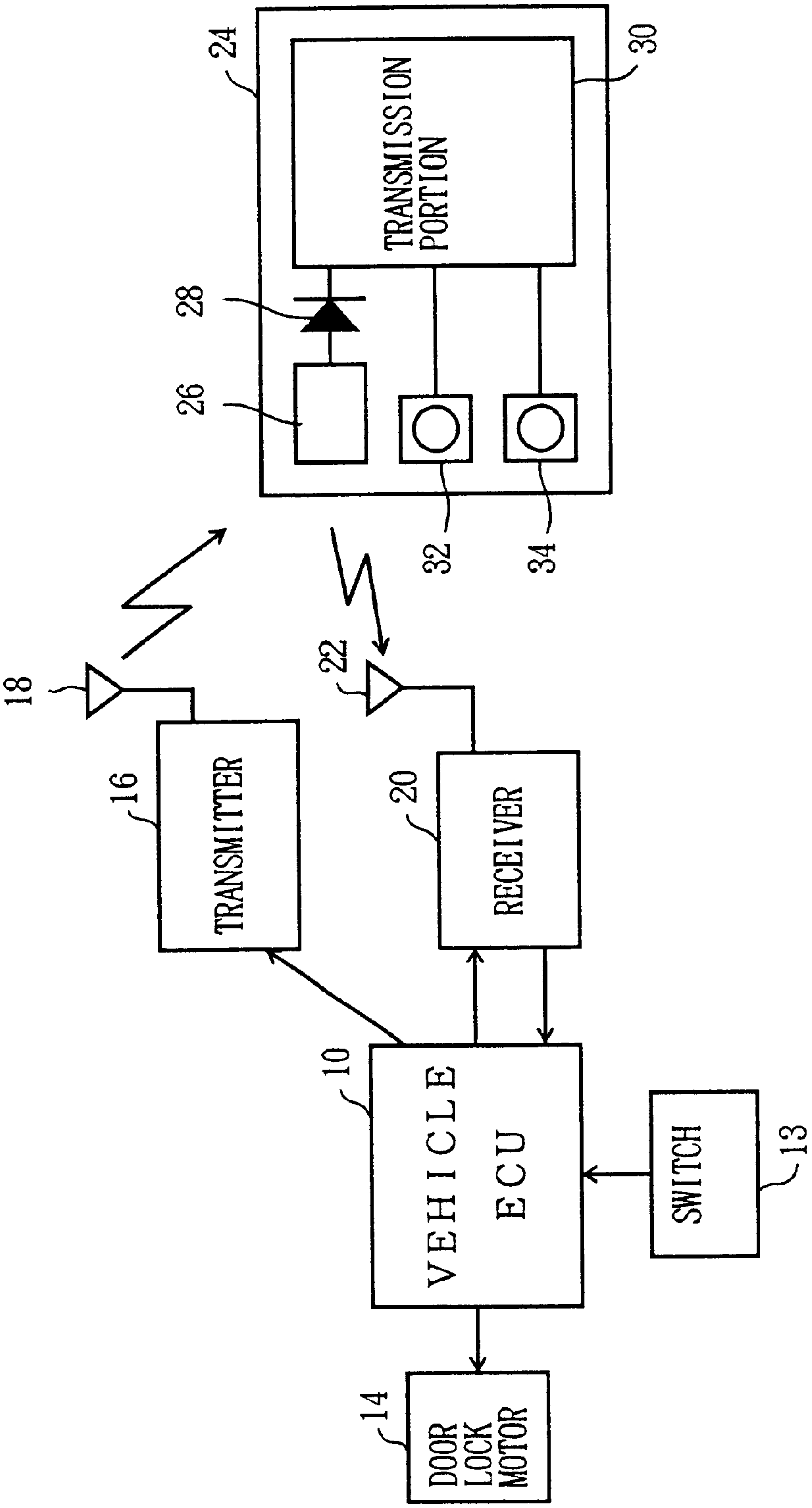
FIG. 1 is a block diagram of a first embodiment of the mobile unit remote control apparatus according to the present invention.

FIG. 1 shows a block diagram of a first embodiment of the mobile unit remote control apparatus according to the present invention. In the diagram, a vehicle ECU (electronic control unit) 10 comprises a microcomputer for controlling a variety of vehicle functions such as the headlights and instruments, the air-conditioning unit and the door locks. The vehicle ECU is supplied with detection signals from light sensors (not shown) and temperature sensors (not shown), and at the same time it is also supplied with signals from a switch 13 operated by the driver when prohibiting smart entry. The door lock motor 14 is driven by the vehicle ECU 10 to lock and unlock the doors of the vehicle.

A transmitter 16 is installed on the vehicle and turns on and off according to the directions it receives from the vehicle ECU 10; when on, the transmitter produces, for example, a 2.45 GHz transmission request signal and transmits this signal from an antenna 18. A receiver 20 is installed on the vehicle and receives at an antenna 22 a, for example, 300 MHz return signal (recognition signal) transmitted from the portable unit 24, which signal it demodulates and supplies to the vehicle ECU 10.

A portable unit 24 receives a transmission request signal from the transmitter 16 at an antenna 26, which signal it detects at a detector 28 and supplies to a transmitter 30. The portable unit 24 commences operation by output from the detector 28 or by the turning on of the lock switch 32 or the unlock switch 34, and generates a, for example, return signal with a 300 MHz carrier wave modulated by a specific code which signal it then transmits from an antenna.

The vehicle ECU 10 and the door lock motor 14 described above correspond to the instrument control means, the transmitter 16 corresponds to the transmitting means and the receiver 20 corresponds to the receiving means. In addition, the antenna 26 and detector 28 and transmitter 30 correspond to the returning means, and lock switch 32 and unlock switch 34 and transmitter 30 correspond to the user operating means.

Figure 2:
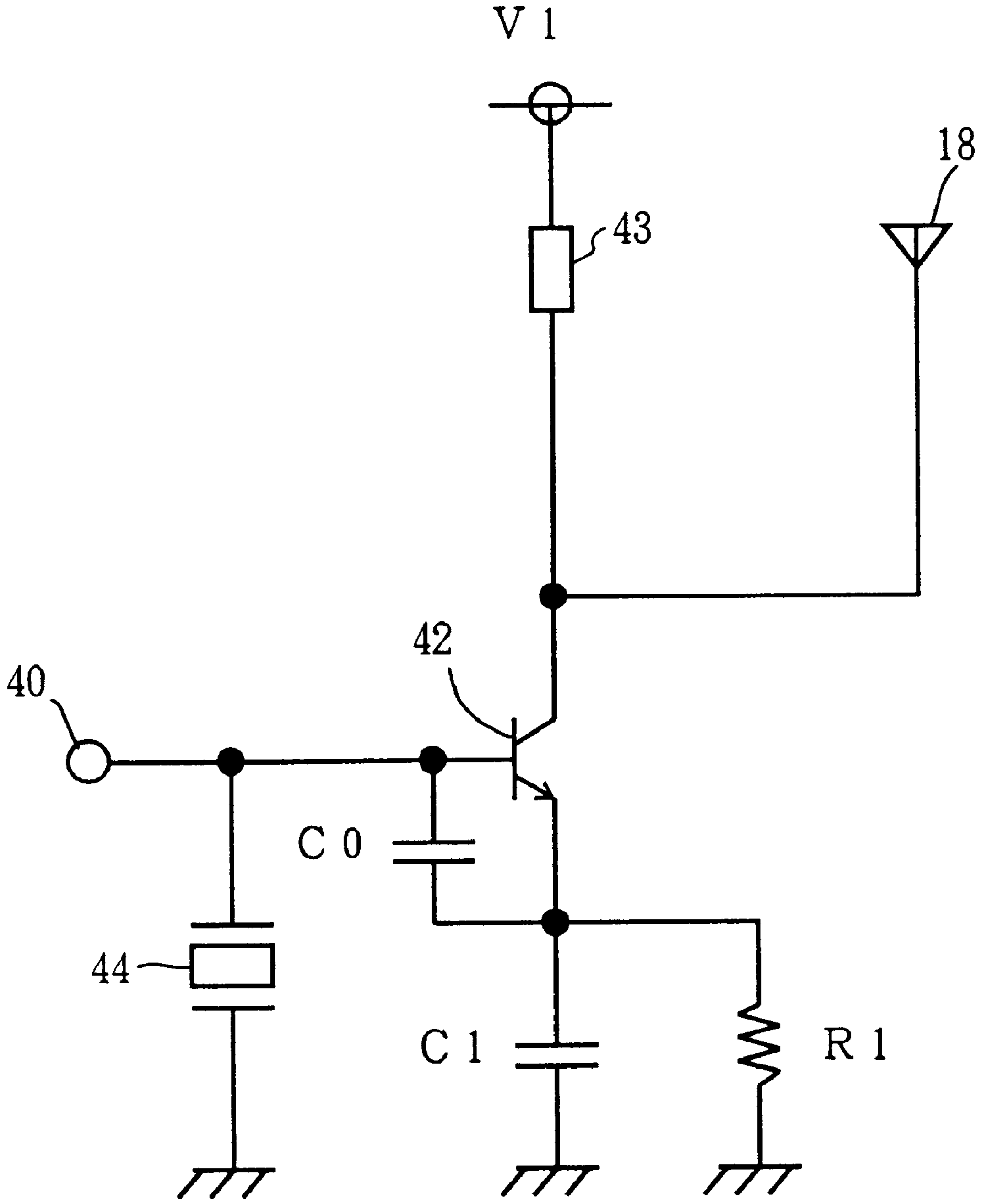
FIG. 2 is a circuit diagram of a transmitter.

FIG. 2 shows a circuit diagram of a first embodiment of the transmitter 16. In the diagram, a control signal from the vehicle ECU 10 is supplied to a terminal 40. The control signal at high level indicates on and at low level indicates off. The terminal 40 is connected to the base of a transistor 42, and this base is grounded through a resonant element 44. The emitter of the transistor 42 is grounded through a condenser C1 and a resistance R1, with a collector connected to power supply V1 through a load 43. In addition, a condenser C is connected between the base and the emitter. An antenna 18 is connected to the collector of the of the transistor 42.

When the control signal supplied to the terminal 40 is at low level the transistor 42 turns off, so there is no transmission. When the control signal is at high level the transistor 42 turns on, the resonant element 44 causes the output of the transistor 42 to oscillate at, for example, a frequency of 2.45 GHz and be transmitted from the antenna 18.

Figure 3:
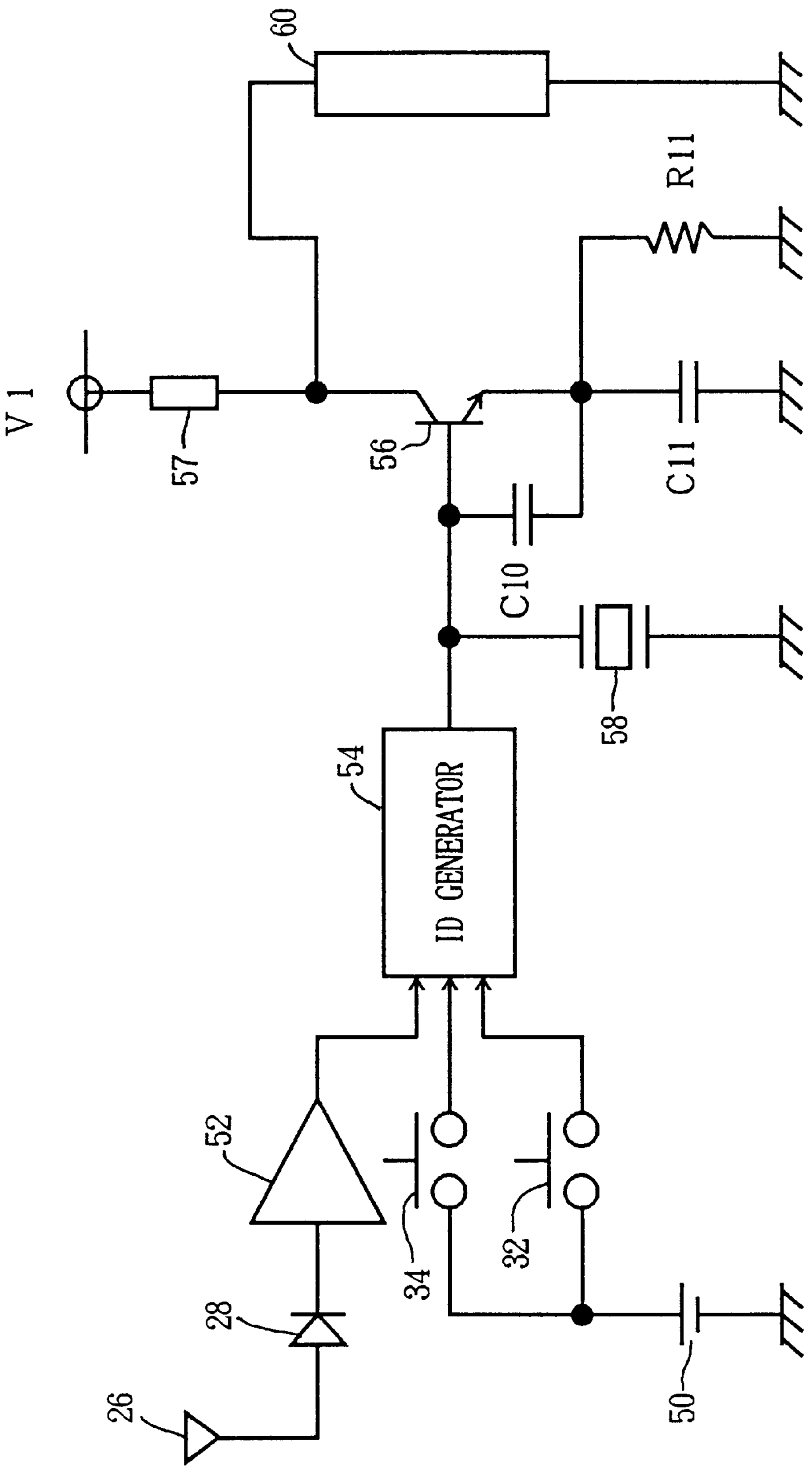
FIG. 3 is a circuit diagram of a first embodiment of the portable unit.

FIG. 3 shows a circuit diagram of a first embodiment of the portable unit. A signal received at the antenna 26 is supplied to the detector 28, which in this case is a signal with a frequency of 2.45 GHz. This detection output is amplified by an amplifier 52 inside the transmitter 30 and supplied to the ID generator 54. In this case, if a 2.45 GHz frequency signal is received then the amplifier 52 outputs a high level trigger signal; if a 2.45 GHz frequency signal is not received then the amplifier 52 output is low level.

In addition, lock switch 32 and unlock switch 34, respectively, are push-to-make switches, so when pressed by the user a high level signal is supplied to the ID generator 54 from a direct current power supply 50. When supplied with a high level signal from either the amplifier 52, the lock switch 32 or the unlock switch unlock switch 34, the ID generator 54 serially reads out recognition codes stored in a built-in register and sets this code at 1 for bit k0 if the trigger is from the amplifier 52, at 1 for bit k2 if the trigger is from the lock switch 32 and at 1 for k1 and an added k0 to k2 if the trigger is from the unlock switch unlock switch 34, after which the signal is supplied to the base of the transistor 56.

This recognition code is data that identifies the portable unit 24; identical recognition codes are stored in the receiver 20 as well as the vehicle ECU 10. In this recognition code, value 1 is high level and value 0 is low level. The base of the transistor 56 is grounded through the resonant element 58. The emitter of the transistor 56 is grounded through a condenser C11 and a resistance R11, with a collector connected to both a power supply V1 through a load 57 and to an antenna 60. In addition, a condenser C10 is connected between the base and the emitter.

When the recognition code is at low level the transistor 56 is off and there is no oscillation. When the control signal is at high level the transistor 56 turns on and the resonant element 58 connected between the base and the emitter causes the transistor 56 output to oscillate at a frequency of, for example, 300 MHz and be transmitted from the antenna 60. In short, this return signal (recognition signal) is an AM-modulated wave that has modulated the 300 MHz carrier by the recognition data.

Figure 4:
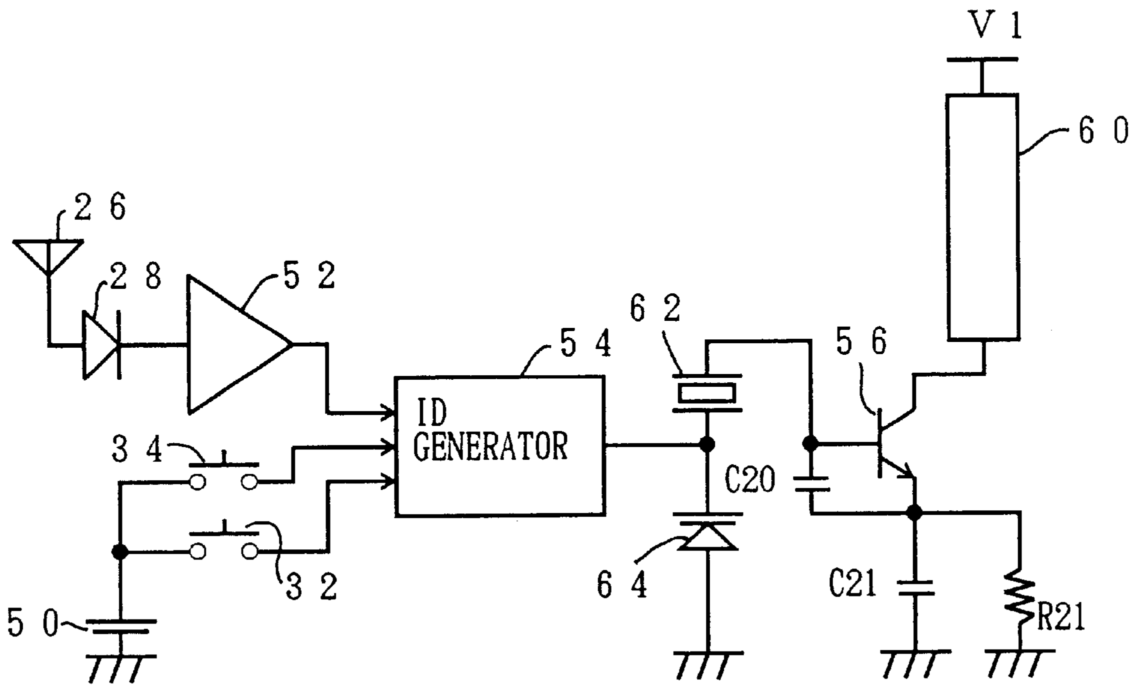
FIG. 4 is a circuit diagram of a second embodiment of the portable unit.

FIG. 4 shows a circuit diagram of a second embodiment of the portable unit 24. A signal received at an antenna 26 is supplied to the detector 28, where a signal with a frequency of 2.45 GHz is detected. This detection output is amplified by the amplifier 52 and supplied to the ID generator 54. In this case, if a 2.45 GHz frequency signal is received then the amplifier 52 outputs a high level signal; if a 2.45 GHz frequency signal is not received then the amplifier 52 output is low level.

In addition, lock switch 32 and unlock switch 34, respectively, are push-to-make switches, so when pressed by the user a high level signal is supplied to the ID generator 54 from a direct current power supply 50. When supplied with a high level signal from either the amplifier 52, the lock switch 32 or the unlock switch unlock switch 34, the ID generator 54 serially reads out a recognition code stored in a built-in register and sets this code at 1 for bit k0 if the trigger is from the amplifier 52, at 1 for bit k2 if the trigger is from the lock switch 32 and at 1 for k1 and an added k0 to k2 if the trigger is from the unlock switch unlock switch 34, after which the signal is supplied to the base of the transistor 56.

This recognition data is data that identifies the portable unit 24; identical recognition codes are stored in the receiver 20 as well as the vehicle ECU 10. For the recognition data, value 1 is high level and value 0 is low level, output after a predetermined voltage offset is added. The output terminal of the ID generator 54 is connected to the base of the transistor 56 and is grounded through a resonant element 62, and at the same time is grounded through a variable capacity diode 64. For this reason the capacity of the variable capacity diode 64 changes depending on whether the recognition data is 1 or 0. The emitter of the transistor 56 is grounded through a condenser C21 and a resistance R21, with a collector connected to one terminal of the antenna 60. In addition, a condenser C10 is connected between the base and the emitter. The other terminal of the antenna 60 is connected to a power supply V1.

The transistor 56 is in an on condition regardless of whether the recognition data is high level or low level, so changes in the level of the recognition data causes the load capacity of the resonant element 62 to change and the oscillation frequency to change to 300±MHz and be transmitted from the antenna 60. In short, this return signal (recognition signal) is an FM-modulated wave that has modulated the 300 MHz carrier by the recognition data.

Figure 5:
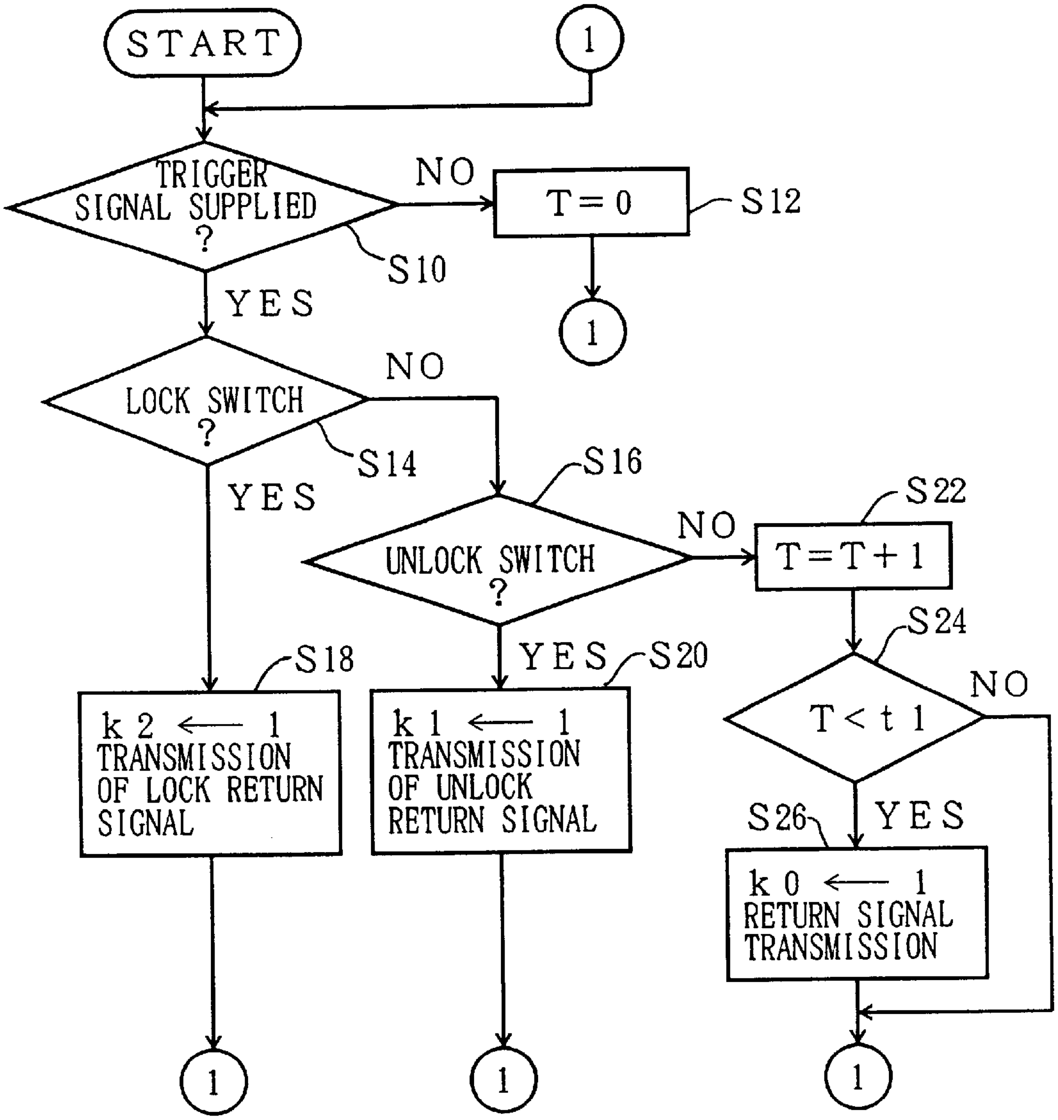
FIG. 5 is a flow chart of processes executed by an ID generator of the portable unit.

FIG. 5 shows a flow chart of an embodiment of processes executed by an ID generator 54 of the portable unit 24. In a step S10 in the chart it is determined whether or not a trigger signal has been supplied. If a trigger signal has not been supplied then the process proceeds to a step S12 and a time T is reset to 0, after which the process proceeds to step S10. If a trigger signal has been supplied then it is determined in a step S14 and a step S16 whether the trigger signal has been supplied from the lock switch lock switch 32, the unlock switch 34 or the amplifier 52.

If it is determined in step S14 that the trigger signal has been supplied from the lock switch 32, then in a step S18 a recognition code is produced by setting bit k2=1 and adding bit k0=k1=0 and transmitted as a lock signal for a predetermined period of time (for example 1 second) or for the period of time that the lock switch 32 is pressed. If it is determined in step S16 that the trigger signal has been supplied from the unlock switch 34, then in a step S20 a recognition code is produced by setting bit k1=1 and adding bit k0=k2=0 and transmitted as an unlock signal for a predetermined period of time (for example 1 second) or for the period of time that the unlock switch 34 is pressed.

If it is determined in step S16 that the trigger signal has been supplied from the amplifier 52 (the trigger signal has not been supplied from the unlock switch 34), then in a step S22 a timer T is advanced 1 unit. Next, in a step 24 it is determined whether or not the timer T value is less than a predetermined time period t1 (t1 being for example 1 second). Only if the timer T value is less than a predetermined time period t1 does the process proceed to a step S26, in which a recognition code is produced by setting bit k0=1 and adding bit k1=k2=0 and transmitted as a return signal. The process returns to step S10 after steps S18, S20 and S26 as described above have been executed, or after it is determined in step S24 that timer T value is greater than or equal to t1, and process described above is repeated.

It should be noted that, in the embodiment described above, the timer T is advanced and compared to a predetermined time period t1 only when the trigger signal is supplied from the amplifier 52. However, the embodiment may also be configured so that the timer T is advanced and compared to a predetermined time period t1 when all trigger signals are supplied. In that case, drainage of the battery, for example by continued depression of the lock switch 32 when inside a pocket, can be prevented.

Figure 6:
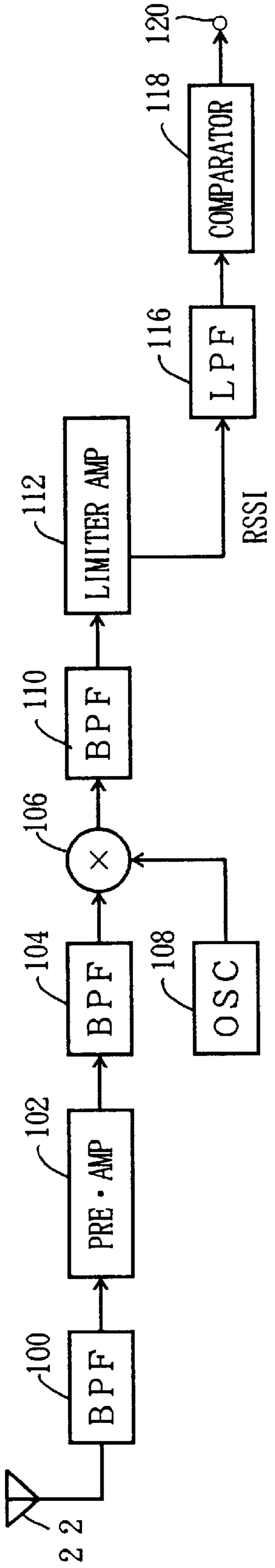
FIG. 6 is a circuit diagram of a first embodiment of the receiver.

FIG. 6 shows a circuit diagram of a first embodiment of the receiver 20. A signal received at the antenna 22 is passed through a band pass filter 100, a pre-amp 102 and a band pass filter 104 so that only signals in the vicinity of 300 MHz are retrieved, amplified and supplied to a mixer 106. A local oscillator 108 emits a local oscillator signal of approximately 300 MHz and supplies 10 that signal to the mixer 106, the received signal and the local oscillator signal are mixed and an intermediate frequency signal of 455 kHz is obtained.

This intermediate frequency signal is passed through a band pass filter 110, undesirable frequency components are removed and the amplitude limited and amplified by the limiter amp 112. After undesirable frequency components for an AM signal are removed by a low-pass filter 116 the RSSI (reception signal strength indicator) signal output of the limiter amp 112 is then compared to a standard level by the comparator 118 and digitized. By doing so, the recognition code transmitted from the portable unit 24 is obtained and supplied to the vehicle ECU 10 from the terminal 120.

Figure 7:
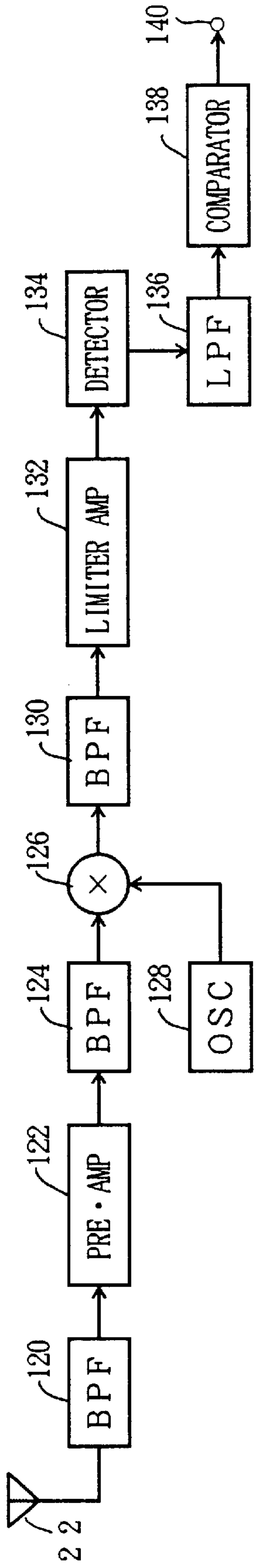
FIG 7. is a circuit diagram of a second embodiment of the receiver.

FIG. 7 shows a circuit diagram of a second embodiment of the receiver 20. A signal received at the antenna is passed through a band pass filter 120, a pre-amp 122 and a band pass filter 124 so that only signals in the vicinity of 300 MHz are retrieved, amplified and supplied to a mixer 126. A local oscillator 128 emits a local oscillator signal of approximately 300 MHz and supplies that signal to the mixer 126, the received signal and the; local oscillator signal are mixed and an intermediate frequency signal of 455 kHz is obtained.

This intermediate frequency signal is passed through a band pass filter 130, undesirable frequency components are removed and the signal supplied to a detector 134 after the amplitude is limited and the signal amplified by the limiter amp 112. After undesirable frequency components are removed by a low-pass filter 136 this detection output is then compared to a standard level by the comparator 118 and digitized. By doing so, the recognition code transmitted from the portable unit 24 is obtained and supplied to the vehicle ECU 10 from the terminal 140.

The vehicle ECU 10 compares the recognition code supplied from the receiver 20 with recognition code stored in the unit itself and drives the door lock motor 14 to lock/unlock the door in response to the values of K0 through K2 when the two codes match.

Figure 8:
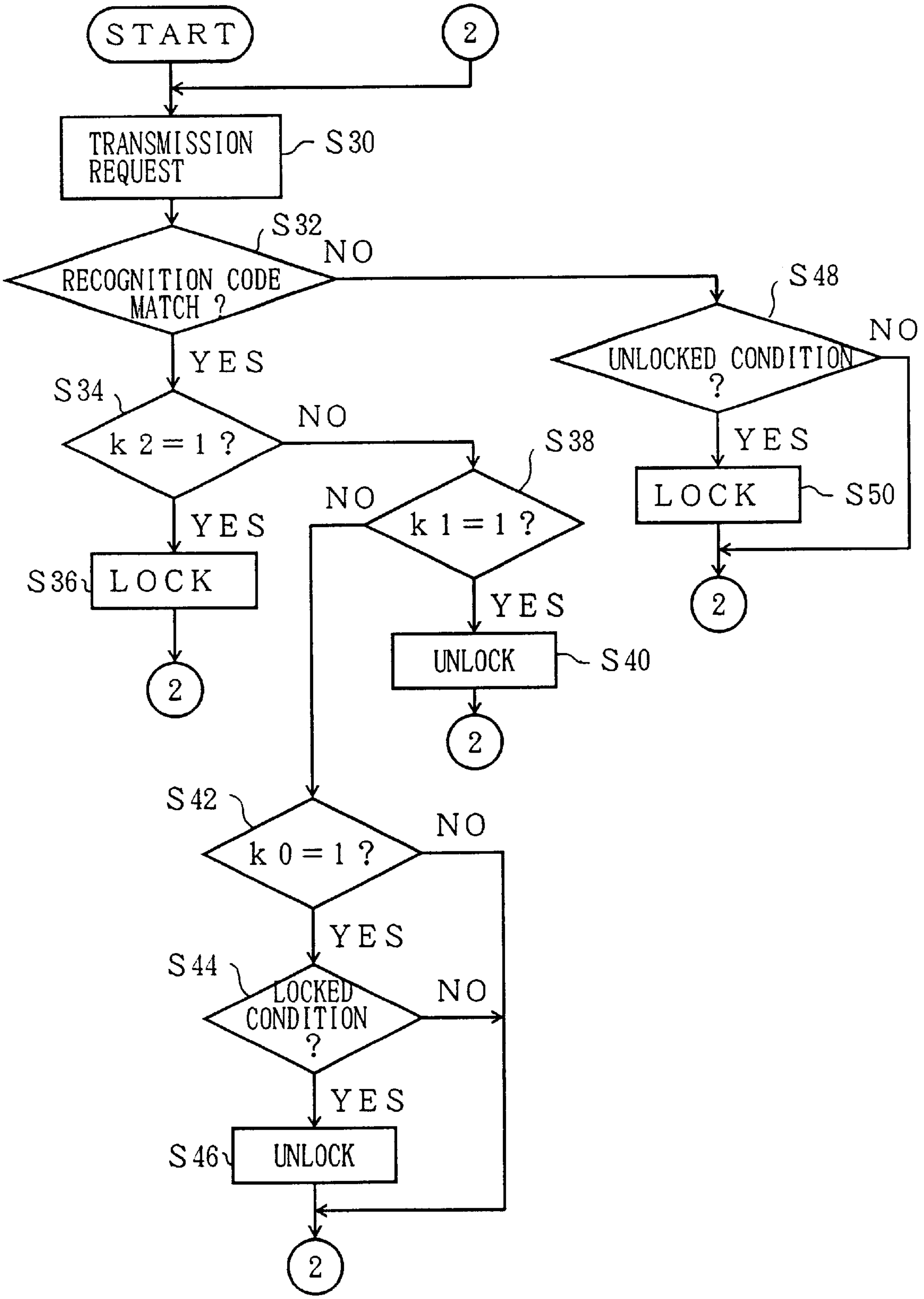
FIG. 8 is a flow chart of a first embodiment of lock/unlock control processes executed by a vehicle ECU.

FIG. 8 shows a flow chart of a first embodiment of lock/unlock control processes executed by a vehicle ECU 10. In a step S30 the vehicle ECU 10 supplies a control signal to the receiver 16 to cause it to transmit a transmission request signal. Thereafter, the vehicle ECU 10 determines whether or not the recognition code of the portable unit 24 received at the receiver 20 in a step S32 matches the recognition code previously stored in the vehicle ECU 10.

If the determination indicates that the two codes match, then in a step S34 the vehicle ECU 10 determines whether or not the bit k2 added to the recognition code is 1 or not. If k2=1, then in a step S36 the vehicle ECU 10 drives the door lock motor 14 to lock the vehicle door and the process returns to step S30. If k2≠1, then in a step S38 the vehicle ECU 10 determines whether or not the bit k1 added to the recognition code is 1 or not. If the bit k1=1, then in a step S40 the vehicle ECU 10 drives the door lock motor 14 to unlock the door and the process returns to step S30. If k1≠1, then in a step S42 the vehicle ECU 10 determines whether or not the bit k0 added to the recognition code is 1 or not. If k=1, then in a step S44 the vehicle ECU 10 determines whether or not the door is in a locked state and, if so, in a step S46 drives the door lock motor 14 to unlock the door, after which the process returns to step S30. If k0≠1 or the door is not in a locked state, then the process returns to step S30.

If in step S32 no recognition code is obtained, then in a step S48 the vehicle ECU 10 determines whether or not the door is in an unlocked state and, if so, in a step S50 drives the door lock motor 14 to lock the door, after which the process returns to step S30.

Figure 9:
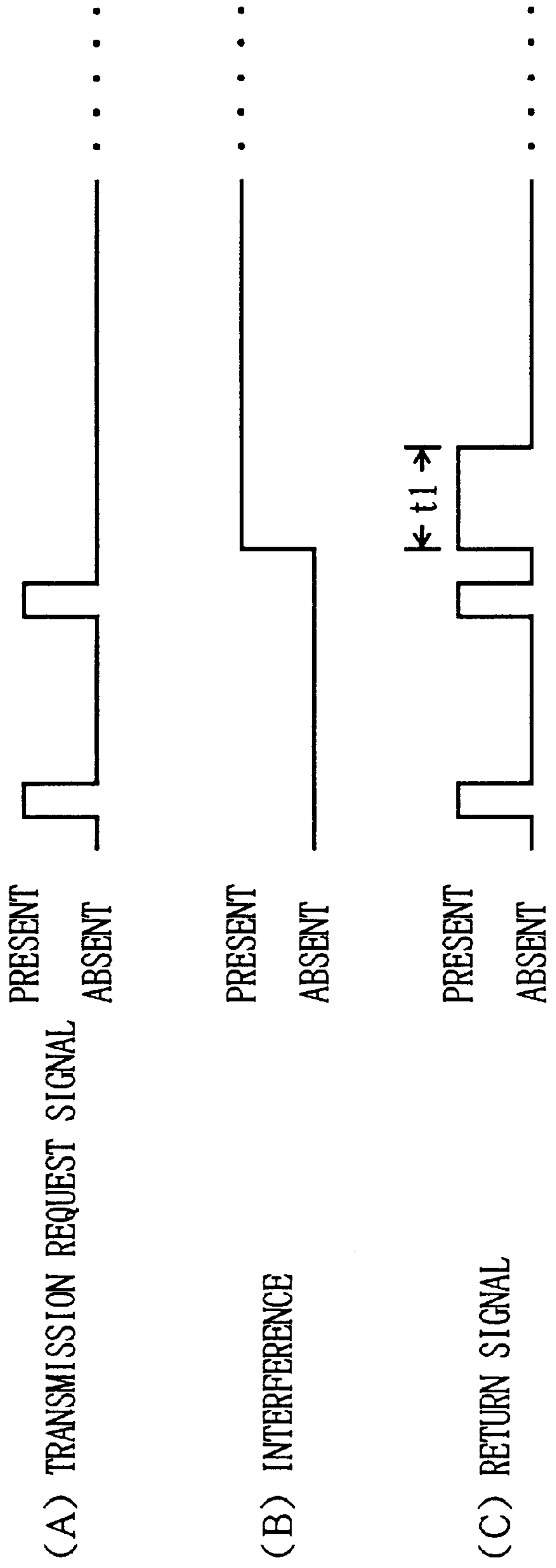
FIG. 9 is a signal timing chart of the present invention.

In the present embodiment, in response to the transmission request signal from the vehicle shown in FIG. 9(A) the portable unit portable unit 24 that receives this transmits the return signal shown in FIG. 9(C). In the event that there exist interference waves like that shown in FIG. 9(B) which resemble the frequency of this transmission request signal the portable unit 24, though it transmits a return signal like that shown in FIG. 9(C), halts this transmission after a time period t1 and thereafter does not transmit. By doing so, unnecessary consumption of power at the portable unit 24 can be prevented. Moreover, even in areas subject to interference, with the portable unit 24 within a predetermined distance from the vehicle and transmitting a transfer signal despite the absence of a transmission request signal, the vehicle door will not be unlocked against the volition of the user. In addition, in the event that trigger signals are emitted simultaneously from the lock switch 32, the unlock switch 34 and the amplifier 52, the order of priority is lock switch 32, unlock switch 34 and amplifier 52, with the lock switch 32 given the highest priority. For this reason competition between the smart entry system and the wireless system can be prevented and a return signal to lock or unlock the vehicle doors can be transmitted by operating either the lock switch 32 or the unlock switch 34 even where a return signal is being continuously transmitted in error due to the influence of interference.

Figure 10:
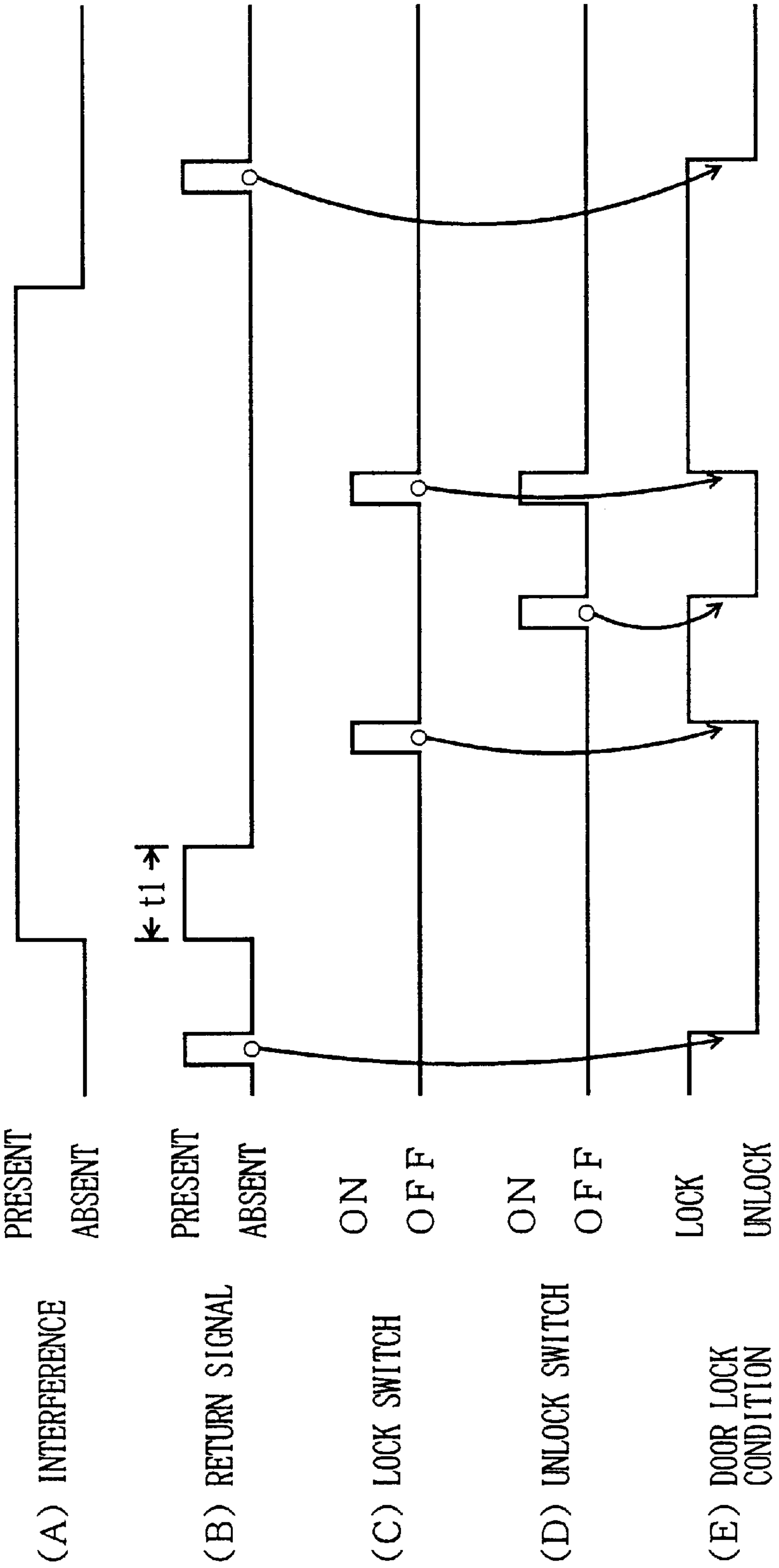
FIG. 10 is a signal timing chart of the present invention.

For example, due to interference like that shown in FIG. 10(A) a return signal halts after a time period t1 as indicated in FIG. 10(B) and thereafter no return signal is transmitted from the portable unit 24. Even in this condition, by operating either the lock switch 32 as shown in FIG. 10(C) or the unlock switch as shown in FIG. 10(D) the vehicle doors can be switched between the locked state and the unlocked state in accordance with the wishes of the user as shown in FIG. 10(E).

The present embodiment has been described on the assumption that it uses the most practical smart entry system. In addition, however, the present invention can also be adapted for use with a variety of remote control systems installed on vehicles, for example a smart ignition system. It goes without saying that the present invention can also be adapted for use in ships and other mobile units.

Figure 11:
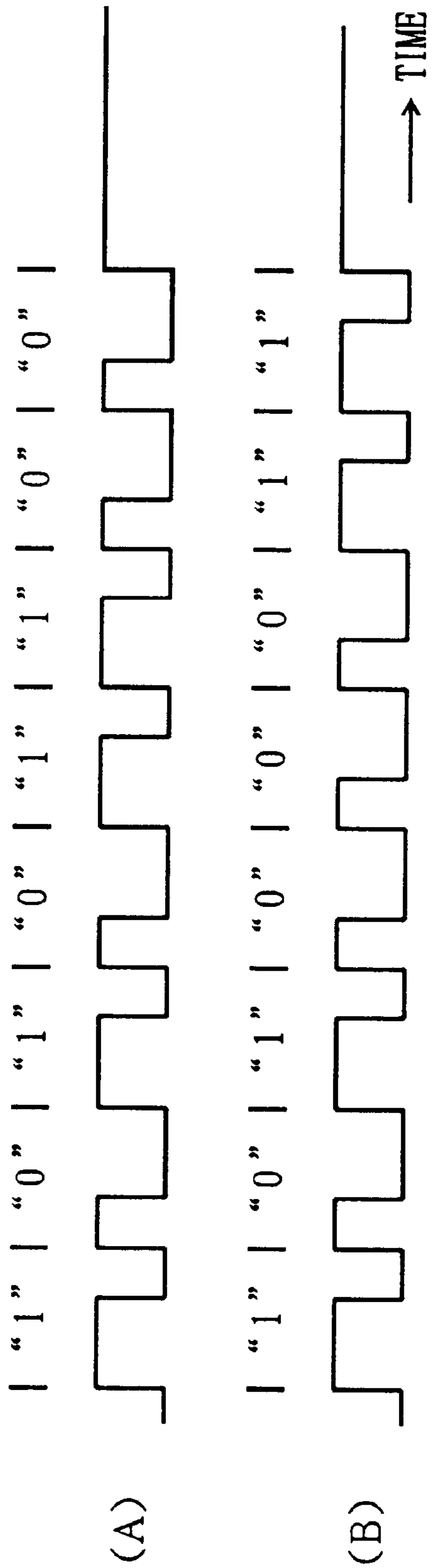
FIG. 11 is a diagram for explaining the format of a transmission request signal of a smart entry system and smart ignition system of the present invention.

For example, in the case of a smart entry system the transmission request signal transmitted from the transmitter 16 assumes a predetermined bit pattern of a PWM code like that shown in FIG. 11(A). In a smart entry system for locking and unlocking the doors of a vehicle the transmission of this transmission request signal is directed toward the outside of the vehicle. However, when the driver gets into the driver's seat the smart ignition system automatically transmits a signal directed toward the interior of the vehicle to start the engine. In the case of this smart ignition system the transmission request signal assumes a predetermined bit pattern of a PWM code like that shown in FIG. 11(A). The difference between FIGS. 11(A) and (B) is the last 4 bits. In this PWM code the bit cycle is fixed; where the duty ratio is 2/3 the value is 1; where the duty ratio is 1/3 the value is 0.

The ID generator 54 of the portable unit 24 to which the smart entry transmission request signal and the smart ignition transmission request signal is supplied decodes the transmission request signal bit pattern from the reception signal and recognizes a smart entry transmission request if the bit pattern is that in FIG. 11(A) and recognizes a smart ignition transmission request if the bit pattern is that in FIG. 11(B). The ID generator 54 then generates a 3-bit status depending on the presence or absence of a trigger based on this recognition or a trigger signal from the lock switch 32 or the unlock switch 34. If there is more than one trigger then priorities are assigned in which the order of priority from highest to lowest is: lock, unlock, smart ignition, smart entry.

If the portable unit 24 is equipped with a lock/unlock toggle switch, a trunk open switch and a panic switch, then the ID generator 54 generates a 3-bit status by assigning priority in order from highest to lowest of, for example, lock/unlock toggle, lock, unlock, trunk open, panic, smart ignition and smart entry. The order of priority is not limited to that described herein but can be varied in a number of ways, for example by assigning the panic switch the highest priority in order to upgrade the system's anti-theft capabilities.

Figure 12:
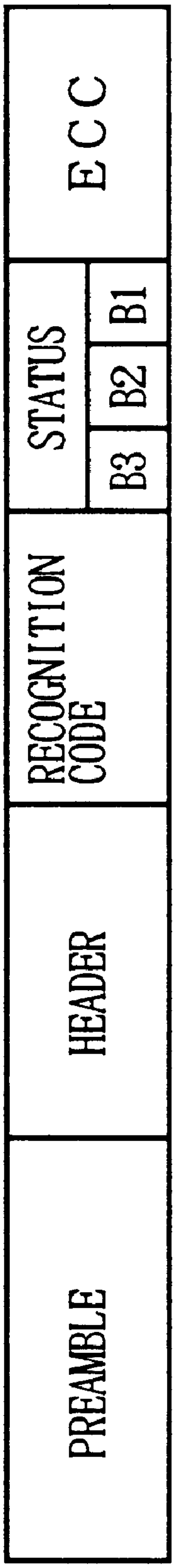
FIG. 12 is a diagram for explaining the format of a return signal.

The ID generator 54 of the portable unit 24 transmits a return signal with a format like that shown in FIG. 12. A synchronizing head section is provided after a preamble section and a recognition code is provided after the head section, followed by a status section and an ECC (Error Correction Code) section. The bit patterns of the preamble, head and recognition code sections are each fixed, while in the status section is stored the 3-bit status generated in the manner described above.

Figure 13:
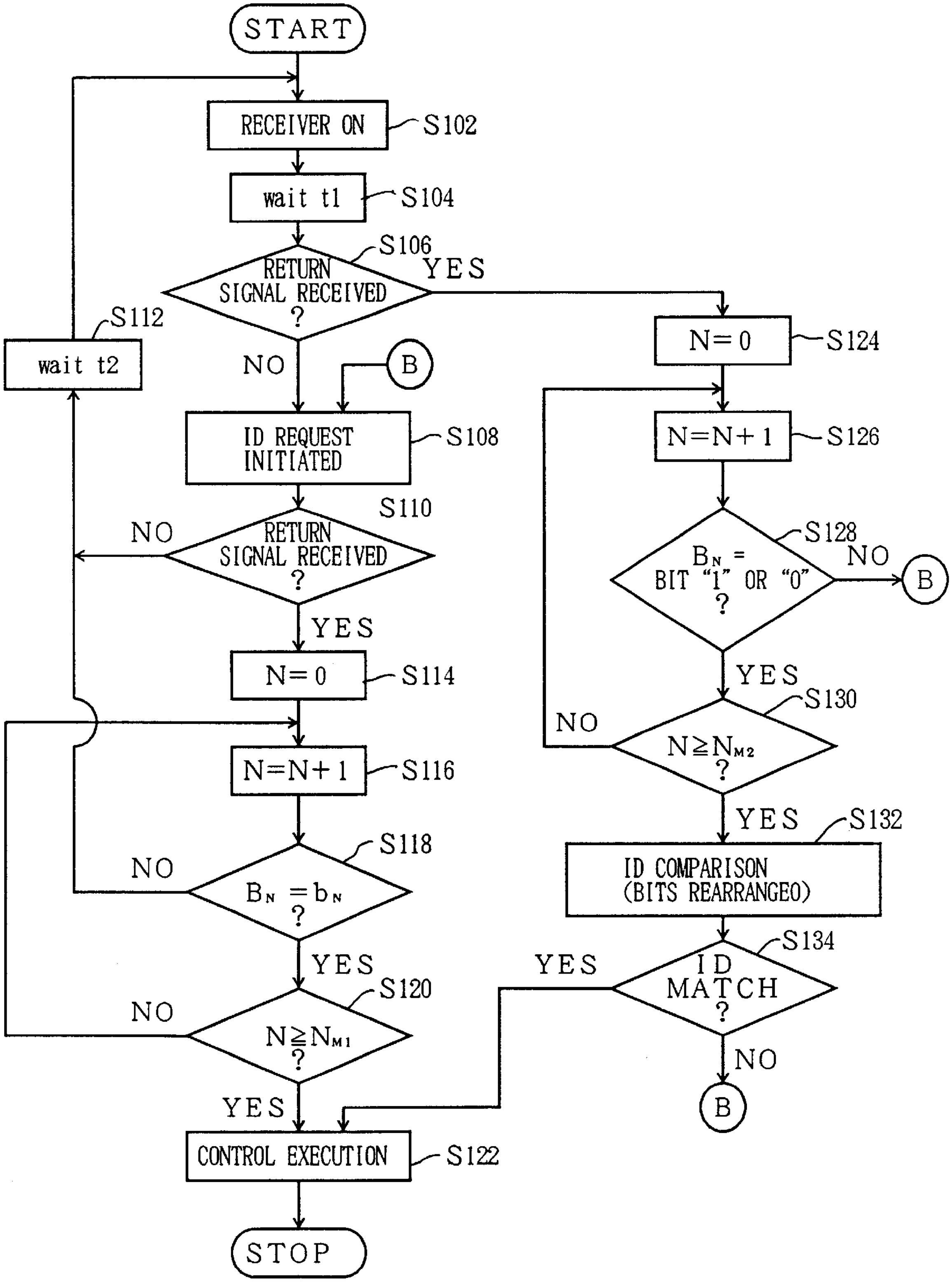
FIG. 13 is a flow chart of a second embodiment of lock/unlock control processes executed by a vehicle ECU.

FIG. 13 shows a flow chart of a second embodiment of lock/unlock control processes executed by the vehicle ECU 10. This flow is repeatedly executed at predetermined intervals. The vehicle ECU 10 in a step S102 turns on the power to the receiver 20 and starts the receiver 20, after which it enters a waiting mode in step S104 of a predetermined period of time (for example 10 msec) during which it waits for the reception condition of the receiver 20 to stabilize. In a step S106 the vehicle ECU 10 determines whether or not the receiver 20 has received a return signal from the portable unit 24 wherein the RSSI signal level at the receiver 20 meets or exceeds a predetermined threshold.

If no return signal from the portable unit 24 has been received, then the vehicle ECU 10 assumes that neither the portable unit 24 lock switch 32 nor the portable unit 24 unlock switch 34 have been operated, proceeds to a step S108 and supplies a control signal to the transmitter 16, causing the transmitter 16 to transmit a transmission request signal. Then, at a step S110, the vehicle ECU 10 determines whether or not the receiver 20 has received a return signal from the portable unit 24 wherein the RSSI signal level at the receiver 20 meets or exceeds a predetermined threshold. If no return signal from the portable unit 24 has been received, then the vehicle ECU 10 assumes that the portable unit 24 is not in the vicinity of the vehicle, turns off the power to the receiver 20 at a step S112 and, after waiting for a predetermined period of time t2 (for example 200 msec), returns to step S102.

If, however, a return signal from the portable unit 24 is received at step S110, then the process proceeds to a step S114 and the counter is set to 0. At a step S116 the counter is increased by just 1 increment and at a step S118 the vehicle ECU 10 determines whether or not the received, demodulated and decoded return signal recognition code bit BN (where N is the counter N value) matches a recognition code bit bN (where N is the counter N value) stored in a built-in register in the vehicle ECU 10. If the two recognition code bits do not match then the vehicle ECU 10 turns off the power to the receiver 20 at a step S112 and, after waiting for a predetermined period of time t2 (for example 200 msec) proceeds to step S102.

If the two recognition code bits do match in step S118, then in a step S120 the vehicle ECU 10 determines whether or not the counter N equals or exceeds a maximum value NM1. If the counter N is less than this maximum value NM1, then the process returns to step S116 and steps S116 through S120 are repeated. NM1 is the number of bits of the recognition code section shown in FIG. 12. Also, if at step S120 N is found to be greater than or equal to Nml then the vehicle ECU 10 proceeds to a step S122, reads the status of the return signal received, executes commands based on that status and thus completes the processing cycle. In other words, the vehicle ECU 10 drives the door lock motor to lock or unlock the door depending on the contents of the status section of FIG. 12. The process is the same for the trunk open and panic operations as well. In the case of the trunk open operation the vehicle ECU 10 unlocks the trunk and in the case of the panic operation the vehicle ECU 10 activates an alarm.

If in step S106 the receiver 20 has received a return signal from the portable unit 24 wherein the RSSI signal level at the receiver 20 meets or exceeds a predetermined threshold, then the process proceeds to a step S124 and the counter is set to 0 because either the portable unit 24 lock switch 32 or the portable unit 24 unlock switch 34 has been operated. At a step S126 the counter is increased by just 1 increment and at a step S128 the vehicle ECU 10 determines whether or not the received and demodulated return signal recognition code bit BN (where N is the counter N value) is value 0 or 1.

The return signal uses a PWM code, so that, for example, the value 110 of this code expresses the bit value 0 and the value 100 of this code expresses the bit value 1. Thus, when the time period of 0 or 1 continues beyond a time period that has added a degree of margin of several tens of percent to the time period of value 11 or value 00 of the PWM code, the vehicle ECU 10 determines that the bit BN is neither value 0 nor value 1.

If it is determined in step S128 that the bit BN is neither value 0 nor value 1, then the vehicle ECU 10 assumes that the reception signal is not a return signal but noise, proceeds to step S108 and supplies a control signal to the transmitter unit 16, causing the transmitter unit 16 to transmit a transmission request signal. If in step S128 the bit BN is either value 0 or value 1, then in a step S130 the vehicle ECU 10 determines whether or not the counter N equals or exceeds a maximum value NM2. If the counter N is less than this maximum value NM2, then the vehicle ECU 10 proceeds to step S126 and repeats steps S126 through S130. NM1 is the number of bits in the entire return signal shown in FIG. 12.

If at step S130 N is greater than or equal to Nm2 then the vehicle ECU 10 proceeds to a step S132 and compares the return signal recognition code with the recognition code stored in the built-in register in the vehicle ECU 10. It is uncertain which number bit of the return signal will be received when the counter N is 0, so this comparison involves shifting the bits from B1 through BNM2 in order and making a comparison with the recognition codes stored in the internal register.

In a step S134 the vehicle ECU 10 determines through this comparison whether or not the recognition numbers match. If there is a match then the vehicle ECU 10 proceeds to step S122, reads the received return signal, executes commands based on that status and thus completes the processing cycle. In other words, in the case of a smart entry system the vehicle ECU 10 drives the door lock motor 14 to lock and unlock the door depending on the contents of the status section of FIG. 12. In the case of a smart ignition system the process is the same, creating an ignition-enable state. In this ignition-enable state the engine will start by pressing a predetermined switch, without insertion of the key in the ignition.

If in step S134 there is no match, then the vehicle ECU 10 assumes that the reception signal is not a return signal but noise, proceeds to step S108 and supplies a control signal to the transmitter unit 16, causing the transmitter unit 16 to transmit a transmission request signal.

Figure 14:
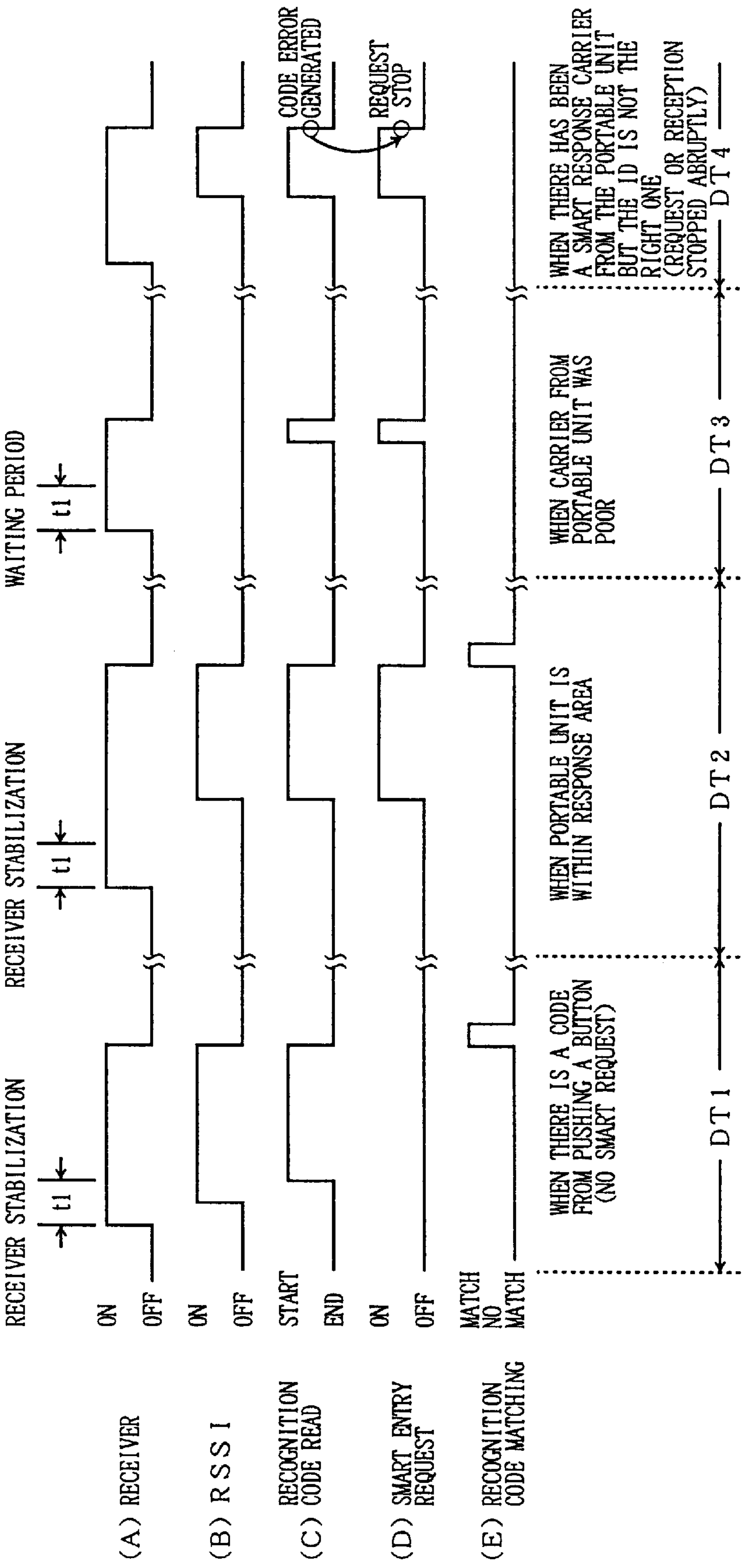
FIG. 14 is a signal timing chart of a second embodiment of the control process of the present invention.

As shown in FIG. 14(A), after the receiver 20 is activated and a predetermined time period t1 has elapsed, the vehicle ECU 10 determines whether or not a return signal from the RSSI signal has been received as shown in FIG. 14(B). If a return signal has been received, then as shown in FIG. 14(C) the recognition code is read. If in a time period DT1 the lock switch 32 or the unlock switch 34 is pressed and a return signal received, then as shown in FIG. 14(D) a transmission request signal is not transmitted. If the return signal recognition code matches the recognition code stored in the built-in register, then as shown in FIG. 14(E) a recognition code matching signal is emitted and the door is locked or unlocked.

If in a time period DT2 neither the lock switch 32 nor the unlock switch 34 is pressed and no return signal is received when the receiver 20 is activated as shown in FIG. 14(A), then as shown in FIG. 14(D) a transmission request signal is transmitted. By doing so, if a smart entry return signal is obtained as shown in FIG. 14(B), then a transmission request signal is transmitted and at the same time the recognition code is read as in FIG. 14(C). If the return signal recognition code matches the recognition code stored in the built-in register, then as shown in FIG. 14(E) a recognition code matching signal is emitted and the door is locked or unlocked by smart entry system control.

If in a time period DT3 no return signal is received when the receiver 20 is activated as shown in FIG. 14(A) and a transmission request signal is transmitted as shown in FIG. 14(D), and no smart entry return signal is obtained as shown in FIG. 14(B), then the reading of the recognition code is halted as shown in 14(C).

Further, if in a time period DT4 no return signal is received when the receiver 20 is activated as shown in FIG. 14(A) and a transmission request signal is transmitted as shown in FIG. 14(D), and a smart entry return signal is obtained as shown in FIG. 14(B), then the recognition code is read as shown in FIG. 14(C) at the same time the transmission request signal is transmitted. If the recognition code of the return signal does not match the recognition code stored in the built-in register, then at that point the reading of the recognition code is halted as shown in FIG. 14(C) and the transmission of the transmission request signal is halted as shown in FIG. 14(D).

In this embodiment, the timing of the activation of the receiver 20 is set to occur prior to the timing of the activation of the transmitter 16, so the wireless system control is given priority over the smart entry system control, preventing competition between the smart entry system and the wireless system.

Figure 15:
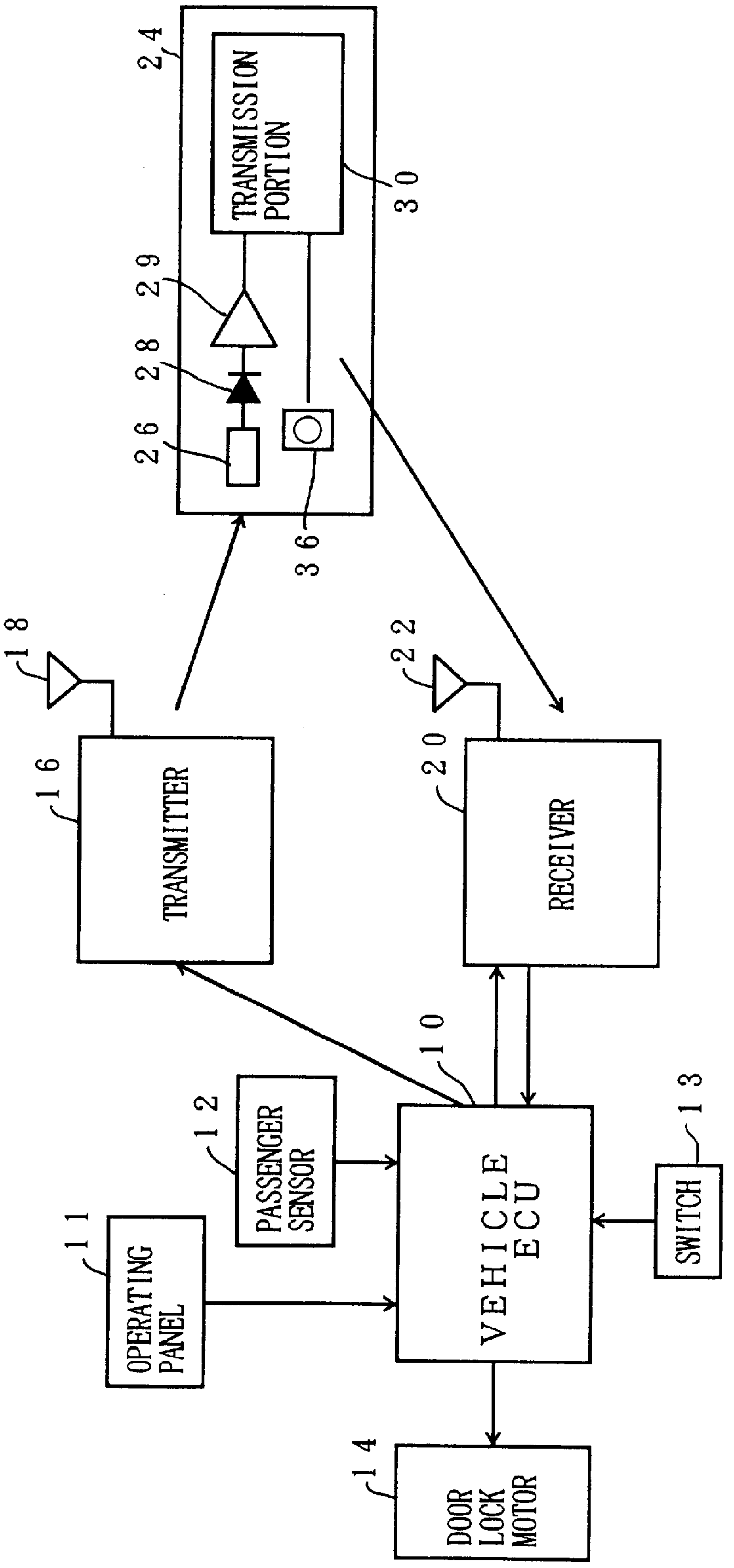
FIG. 15 is a block diagram of a second embodiment of the mobile unit remote control apparatus according to the present invention.

FIG. 15 shows a block diagram of a second embodiment of the mobile unit remote control apparatus according to the present invention. Parts identical to those of FIG. 1 are assigned identical names. The vehicle ECU 10 that acts as the control means comprises a microcomputer for controlling a variety of vehicle functions, such as the headlights and instruments, the air-conditioning unit and the door locks. The vehicle ECU is supplied with detection signals from light sensors (not shown) and temperature sensors (not shown); at the same time, the vehicle ECU 10 also sets the time from an operation panel 11 operating as a signal time setting means and is supplied with detection signals from a passenger sensor 12 operating as a passenger detection means, and it is further supplied with signals from a switch 13 operated by the driver when prohibiting smart entry. The door lock motor 14 is driven by the vehicle ECU 10 to lock and unlock the doors of the vehicle.

A transmitter 16 is installed on the vehicle and turns on and off according to the directions it receives from the vehicle ECU 10; when on, the transmitter produces, for example, a 2.45 GHz transmission request signal and transmits this signal from an antenna 18. A receiver 20 is installed on the vehicle and receives at an antenna 22 a, for example, 300 MHz return signal (recognition signal) transmitted from the portable unit 24, which signal it demodulates and supplies to the vehicle ECU 10.

The portable unit 24 receives a transmission request signal from the transmitter 16 at an antenna 26 and, after detecting the signal at the detector 28, amplifies it at the amplifier 29 and supplies it to the transmitter 30. The transmitter 30 commences operation by output from the amplifier 29 or the turning on of the switch 36, and generates a, for example, return signal with a 300 MHz carrier wave modulated by a specific code, which signal it then transmits from the antenna.

Figure 16:
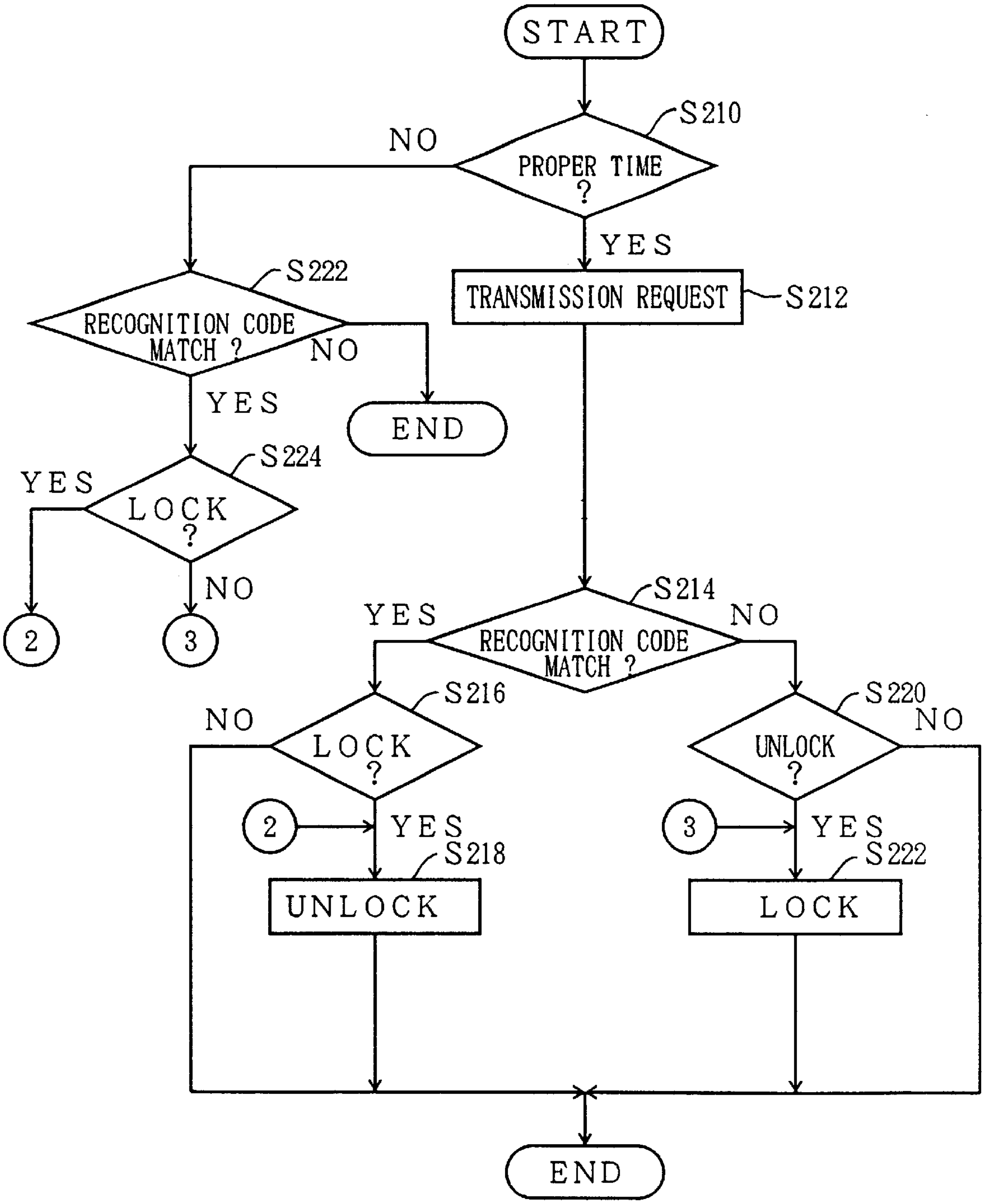
FIG. 16 is a flow chart of the smart entry processes executed by the vehicle ECU.

FIG. 16 shows a flow chart of the smart entry processes executed by the vehicle ECU 10 shown in FIG. 15. The processes shown in FIG. 16 are executed at every predetermined interval, for example every several hundred msec. At a step S210 the vehicle ECU 10 determines whether or not it is time to carry out a transmission request. A transmission request is executed at the rate of once every several times the processes shown in FIG. 8 are repeated. If the timing is correct then the vehicle ECU 10 proceeds to a step S212, supplies a predetermined pattern high level control signal to the transmitter 16, sends a transmission signal from the transmitter 16 to request a transmission from the portable unit 24 and proceeds to a step S214 wherein the process of locking or unlocking the door is carried out.

In step S214, the vehicle ECU 10 determines whether or not the portable unit 24 recognition code received at the receiver 20 matches the recognition code previously stored in the vehicle ECU 10. If there is a match, then in a step S216 the vehicle ECU 10 determines whether or not the vehicle doors are in a locked condition and, if so, in a step S218 drives the door lock motor 14 to unlock the door and the process is completed. If in step S224 the door is not in a locked condition then the process is completed then and there.

If in step S214 no portable unit 24 recognition code is obtained, then in a step S220 the vehicle ECU 10 determines whether or not the vehicle doors are in an unlocked condition and, if so, in a step S222 drives the door lock motor 14 to lock the door and the process is completed. If in step S220 the door is not in an unlocked condition then the process is completed then and there. Thus, smart entry/smart lock is executed, wherein the vehicle doors are locked if a recognition code from the portable unit 24 is received at the receiver 20 when a transmission request is sent from the transmitter 16 to the portable unit 24, and the vehicle doors are locked if said recognition code is not received.

However, if in step S210 the vehicle ECU 10 determines that it is not time to carry out a transmission request, then it proceeds to a step S222. In step S22, the portable unit 24 recognition code is received at the receiver 20 and the vehicle ECU 10 determines whether or not this recognition code matches the recognition code previously stored in the vehicle ECU 10. If there is a match then the portable unit 24 switch 36 has been operated to lock/unlock the door, so the vehicle ECU 10 proceeds to step S224 and determines whether or not the vehicles doors are in a locked condition and, if so, proceeds to step S218 and unlocks the doors. If the doors are not in a locked condition then the vehicle ECU 10 proceeds to step S22 and locks the doors. In short, every time the portable unit 24 switch 36 is operated the vehicle doors switch between a locked condition and an unlocked condition.

Figure 17:
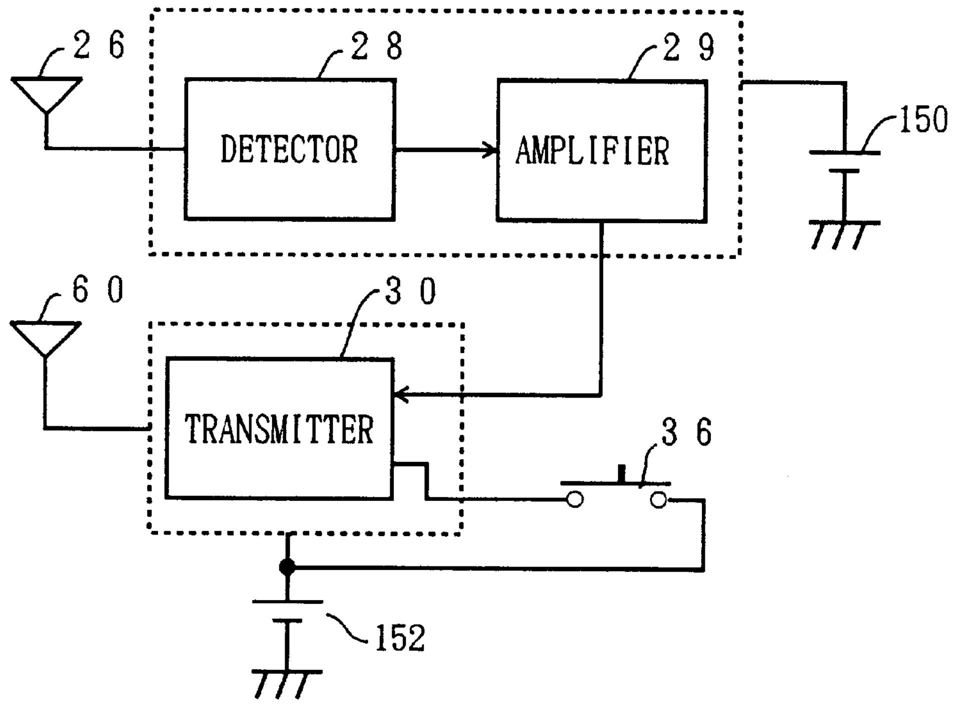
FIG. 17 is a block diagram for explaining a first embodiment of a power supply unit of the present invention.

FIG. 17 shows a block diagram for explaining a first embodiment of a power supply unit of the portable unit 24. Two batteries 150, 152 are provided inside the portable unit 24. Battery 150, which constitutes a first power supply, supplies power to the detector 28 and the amplifier 29. Battery 152, which constitutes a second power supply, supplies power to the transmitter 30 and at the same time supplies power to the switch 36 shown in FIG. 3 as a direct current power supply 50.

In this embodiment there are two power supply systems. Therefore, the wireless system will operate even if the first battery 150 is drained and the smart entry system no longer operates because the portable unit 24 becomes unable to receive the transmission request signal due to the heavy consumption of power by the detector 28 as well as the amplifier 29, because power for the transmitter 30 and the switch 36 is secured by the second battery 152. In short, by pressing the switch 36 a recognition code modulated wave, in other words a return signal, can be transmitted from the antenna 60.

Figure 18:
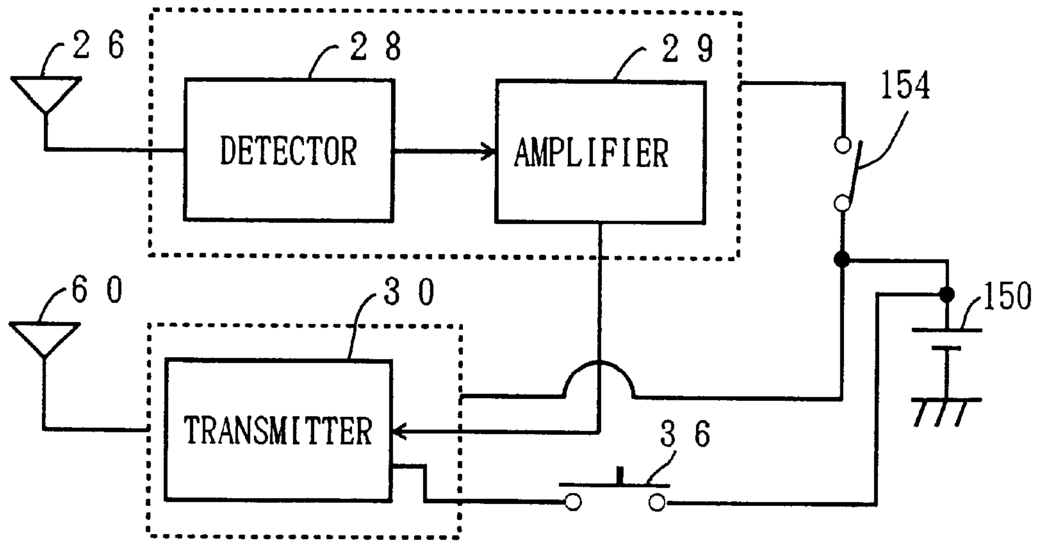
FIG. 18 is a block diagram for explaining a second embodiment of a power supply unit of the present invention.

FIG. 18 shows a block diagram for explaining a second embodiment of a power supply unit of the portable unit 24. The battery 150 acts as a common power supply and supplies power to the portable unit 24. What is different from the conventional configuration is the provision of a mechanical switch 154 on the power line between the battery 150 on the one hand and the detector 28 and amplifier 29 on the other. Firm voltage is supplied from the battery 150 to the transmitter 30 and the switch 36.

In this embodiment, power consumption by the detector 28 and the amplifier 29 can be halted and drainage of the battery 150 can be minimized when the smart entry system is not in use by turning the mechanical switch which acts as a change-over switch to the off position. In this case, too, power is being supplied from the battery 150 to the transmitter 30 and the switch 36, so the apparatus can be made to operate as a wireless system. In addition, by turning the mechanical switch 154 on the apparatus can be made to operate as a smart entry system. It should be noted that the mechanical switch may be changed to an electronic switch configured so that this electronic switch is switched on and off simply by pressing the switch 36 a specified number of times within a predetermined time period.

Figure 19:
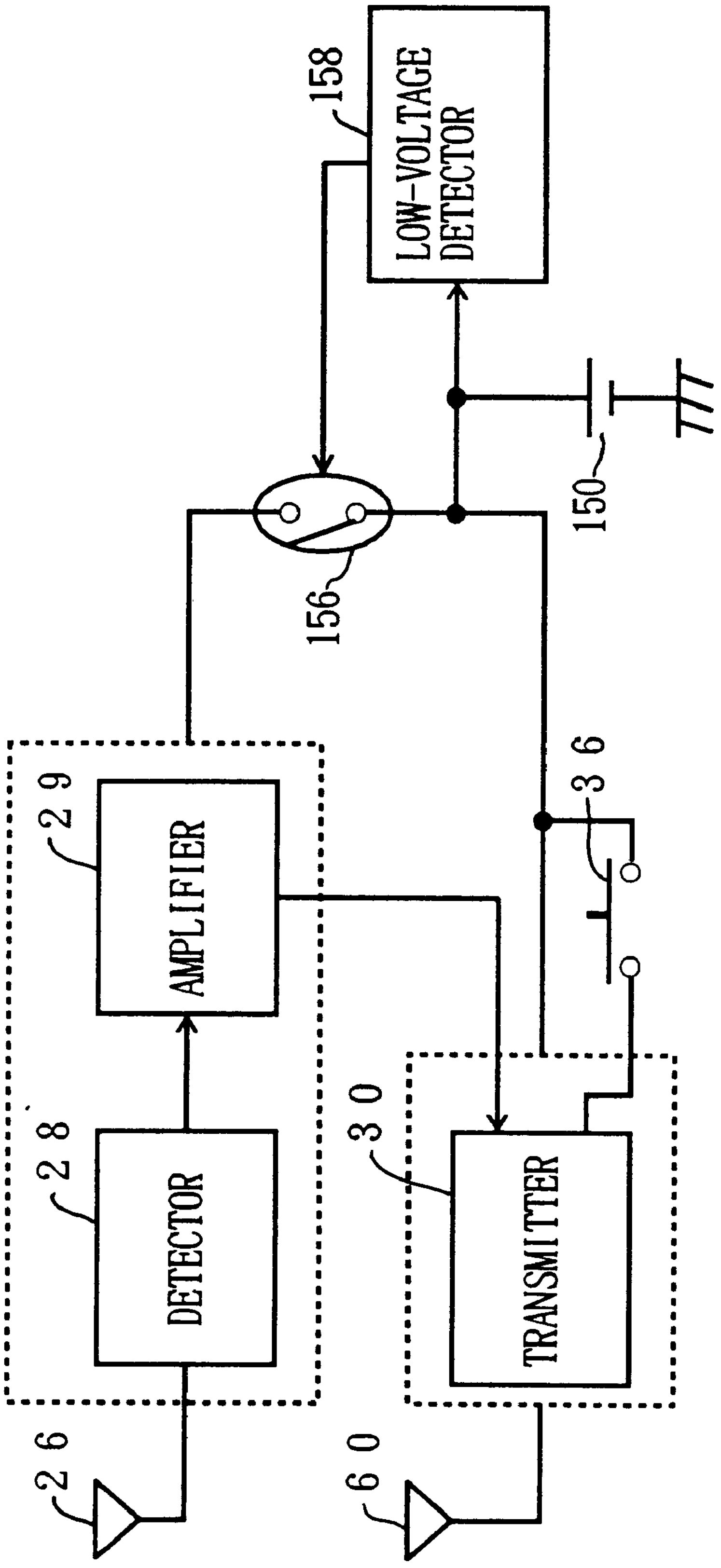
FIG. 19 is a block diagram for explaining a third embodiment of a power supply unit of the present invention.

FIG. 19 shows a block diagram for explaining a third embodiment of a power supply unit of the portable unit 24. A single battery 150 supplies power to the portable unit 24. What is different from the conventional configuration is the provision of an electronic switch 156 on the power line between the battery 150 on the one hand and the detector 28 and amplifier 29 on the other, with the on/off being controlled by a low-voltage detector 158. Firm voltage is supplied from the battery 150 to the transmitter 30 and the switch 36.

The low-voltage detector 158 detects the battery 150 voltage and generates a change-over control signal which it supplies to the electronic switch 156, such signal being for example 1 when the battery voltage is at or above a threshold value and 0 when the battery voltage is below a certain threshold value. The electronic switch 156 turns on when the change-over signal is 1 and turns off when the change-over signal is 0.

That is, the electronic switch 156 turns on, power is supplied to the detector 28 and the amplifier 29 and the smart entry system operates when the battery voltage meets or exceeds a threshold value and the current capacity is ample. As the battery 150 drains and the battery voltage falls below a threshold value the electronic switch 156 turns off, halting the supply of power to the detector 28 and the amplifier 29 and minimizing drainage of the battery 150. In this case, too, power is supplied from the battery 150 to the transmitter 30 and the switch 36, so the apparatus can be made to operate as a wireless system.

In addition, the user can detect the drainage of the battery 150 from the fact that the smart entry system no longer operates, thereby aiding the user in the replacement of the battery.

Figure 20:
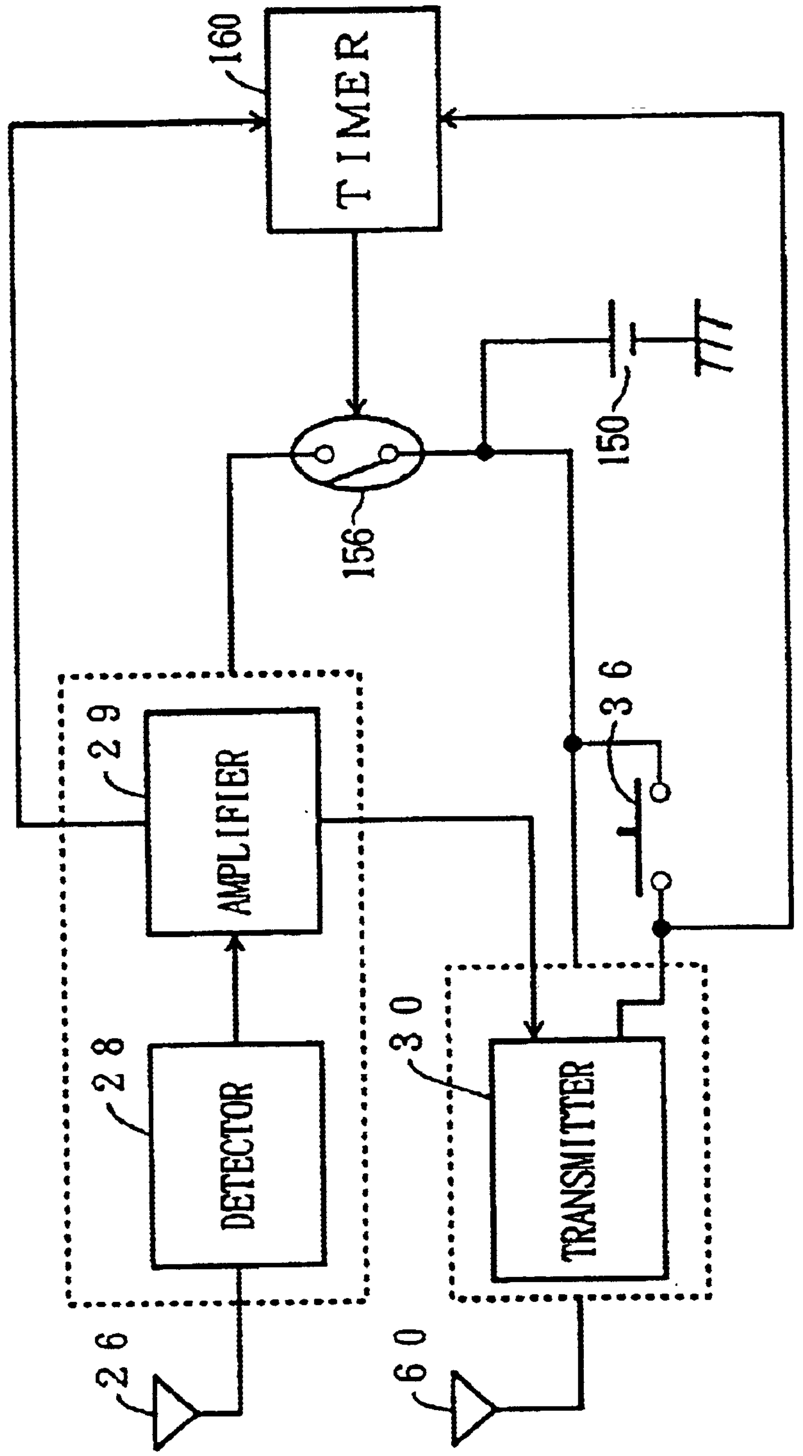
FIG. 20 is a block diagram for explaining a fourth embodiment of a power supply unit of the present invention.

FIG. 20 shows a block diagram for explaining a fourth embodiment of a power supply unit of the portable unit 24. A single battery 150 supplies power to the portable unit 24. What is different from the conventional configuration is the provision of an electronic switch 156 on the power line between the battery 150 on the one hand and the detector 28 and amplifier 29 on the other, with the on/off being controlled by a timer 160. Firm voltage is supplied from the battery 150 to the transmitter 30 and the switch 36.

The timer 160 is reset when a high level signal is supplied from the amplifier 29 or the switch 36, after which it starts. The timer 160 generates and supplies to the electronic switch 156 a change-over control signal of 1 when the time measured is less than a predetermined value (for example several hours) and a change-over signal of 0 when the time measured is equal to or greater than a predetermined value. The electronic switch 156 turns on when the change-over signal is 1 and turns off when the change-over signal is 0.

That is, after a predetermined time period after the last reception of a transmission request signal, or after a predetermined time period after the last operation of the switch 36, the user is deemed to have left the vicinity of the vehicle and the electronic switch 156 turns off, halting current consumption by the detector 28 and the amplifier 29 and minimizing drainage of the battery 150. In this case, too, power is supplied from the battery 150 to the transmitter 30 and the switch 36, so the apparatus can be made to operate as a wireless system.

What is claimed is:

1. A mobile unit remote control apparatus, comprising:

a transmitter for transmitting transmission request signals mounted on the mobile unit;

a receiver, mounted on the mobile unit, for receiving recognition signals transmitted from a portable unit;

an instrument control circuit, mounted on the mobile unit, for controlling instruments installed on the mobile unit in response to a recognition signal received by the receiver;

a response circuit, mounted on said portable unit, for transmitting a recognition signal in response to a transmission request signal transmitted from said transmitter; and an operation circuit, mounted on the portable unit, for transmitting a recognition signal in response to operating input from an external source, unrelated to the transmission request signal, wherein priority rankings are assigned to the transmission of the recognition signal by said response circuit and the transmission of the recognition signal by said operation circuit, and wherein said receiver mounted on said mobile unit is started before said transmitter is started, and when the receiver receives the recognition signal of the operation circuit, the transmitter is prohibited from transmitting said transmission request signals.

2. The mobile unit remote control apparatus according to claim 1, wherein a bit arrangement is performed when the receiver has received the recognition signal.

3. A mobile unit remote control apparatus comprising:

a transmitter for transmitting transmission request signals mounted on the mobile unit;

a receiver mounted on the mobile unit for receiving recognition signals transmitted from a portable unit;

an instrument control circuit mounted on the mobile unit for controlling instruments installed on the mobile unit in response to a recognition signal received by the receiver;

a response circuit mounted on said portable unit for transmitting the recognition signal in response to a transmission request signal transmitted from said transmitter; and a halting means provided on said portable unit for halting the transmission of the recognition signal after a pre determined period of time has passed when a trigger signal indicating the reception of the transmission request signal has been continuously generated, the transmission of the recognition signal being performed based on the generation of the trigger signal.

4. A mobile unit remote control apparatus comprising:

a transmitter for transmitting transmission request signals mounted on a mobile unit;

a receiver mounted on the mobile unit for receiving recognition signals transmitted from a portable unit;

an instrument control circuit mounted on the mobile unit for controlling instruments installed on the mobile unit in response to a recognition signal received by the receiver;

a response circuit mounted on the portable unit for transmitting a recognition signal in response to a transmission request signal transmitted from the transmitter, the response circuit including a detector detecting the transmission request signal received by said response circuit;

an operation circuit mounted on the portable unit for transmitting the recognition signal in response to operating input from an external source, unrelated to said transmission request signal; and a first power supply for supplying power only to said response circuit, and a second power supply for supplying power only to said operation circuit.

5. A mobile unit remote control apparatus comprising: a transmitter, mounted on a mobile unit, for transmitting transmission request signals;

a receiver mounted on the mobile unit for receiving recognition signals transmitted from a portable unit;

an instrument control circuit mounted on the mobile unit for controlling instruments installed on the mobile unit in response to a recognition signal received by the receiver;

a response circuit mounted on said portable unit for transmitting a recognition signal in response to a transmission request signal transmitted from said transmitter, the response circuit including a detector detecting the transmission request signal received by said response circuit;

an operation circuit mounted on the portable unit for transmitting a recognition signal in response to operating input from an external source, unrelated to the transmission request signal; and a common power supply for supplying power to said response circuit and said operation circuit, and power supply interrupting means for interrupting the supply of power to said detector of said response circuit, wherein the interrupting means supplies power to said operation circuit.

6. The mobile unit remote control apparatus as claimed in claim 5, wherein said power supply interrupting means comprises a switch provided between said common power supply and said response circuit, wherein the switch stops power supply to said response circuit and supplies power to said operation circuit when contacts of the switch are open.

7. The mobile unit remote control apparatus as claimed in claim 5, wherein said power supply interrupting means comprises a breaker circuit that interrupts the supply of power to said response circuit when the current capacity of the common power supply falls short of a predetermined value, wherein the break circuit stops power supply to said response circuit and supplies power to said operation circuit.

8. The mobile unit remote control apparatus as claimed in claim 5, wherein said power supply interrupting means comprises a breaker circuit that interrupts the supply of power to said response circuit when the recognition signal from said portable unit is not transmitted for a predetermined period of time, wherein the break circuit stops power supply to said response circuit and supplies power to said operation circuit.

* * * * *